(12) United States Patent
Otake

(10) Patent No.: US 9,019,618 B2
(45) Date of Patent: Apr. 28, 2015

(54) VARIABLE FOCAL LENGTH LENS SYSTEM AND IMAGE PICKUP APPARATUS

(71) Applicant: Sony Corporation, Tokyo (JP)

(72) Inventor: Motoyuki Otake, Saitama (JP)

(73) Assignee: Sony Corporation, Tokyo (JP)

(*) Notice: Subject to any disclaimer, the term of this patent is extended or adjusted under 35 U.S.C. 154(b) by 139 days.

(21) Appl. No.: 13/777,332

(22) Filed: Feb. 26, 2013

(65) Prior Publication Data

US 2013/0242165 A1 Sep. 19, 2013

(30) Foreign Application Priority Data

Mar. 13, 2012 (JP) ................................. 2012-056251

(51) Int. Cl.
- *G02B 15/14* (2006.01)
- *G02B 13/00* (2006.01)
- *G02B 15/17* (2006.01)

(52) U.S. Cl.
CPC ............... *G02B 13/009* (2013.01); *G02B 15/14* (2013.01); *G02B 15/17* (2013.01)

(58) Field of Classification Search
CPC .... G02B 15/173; G02B 15/177; G02B 15/14; G02B 13/04; G02B 13/22
USPC .................. 359/676, 680–682, 684
See application file for complete search history.

(56) References Cited

U.S. PATENT DOCUMENTS 5,442,485 A * 8/1995 Yamanashi .................... 359/683
2001/0013978 A1* 8/2001 Mihara ......................... 359/680

FOREIGN PATENT DOCUMENTS

| JP | 2002-323656 A | 11/2002 |
| JP | 2003-241092 A | 8/2003 |
| JP | 2007-114432 A | 5/2007 |
| JP | 2009-156891 A | 7/2009 |
| JP | 2010-237453 A | 10/2010 |

* cited by examiner

*Primary Examiner* — James Greece
(74) *Attorney, Agent, or Firm* — Sony Corporation

(57) ABSTRACT

Disclosed herein is a variable focal length lens system including: a first lens group having a positive refracting power; a second lens group having a negative refracting power; a third lens group having a negative refracting power; a fourth lens group having a positive refracting power; and a fifth lens group having a positive refracting power; all of the first to fifth lens groups moving, when a positional state of the variable focal length lens system changes from a wide angle end state to a telephoto end state; the fifth lens group being configured from a first sub lens group and a second sub lens group; and the variable focal length lens system satisfying the following expression (1):

$$0.5 < Dsub/fw < 0.9.$$

7 Claims, 17 Drawing Sheets

VARIABLE FOCAL LENGTH LENS SYSTEM AND IMAGE PICKUP APPARATUS

BACKGROUND

The present technology relates to a variable focal length lens system and an image pickup apparatus. More particularly, the present technology relates to a technical field of a variable focal length lens system which is suitable for a digital camera or a video camera and particularly in which the angle of view in a wide angle end state ranges approximately from 24 to 35 mm in a 35 mm equivalent angle of view and the zoom ratio is approximately four to seven times and an image pickup apparatus which includes such a variable focal length lens system as just described.

A method is known wherein an image pickup device which uses a photoelectric conversion element such as a CCD (Charge Coupled Device) element or a CMOS (Complementary Metal Oxide Semiconductor) element as recording unit for a camera is used such that an image of an image pickup object formed on a face of the image pickup element is converted into and recorded as an electric output.

Together with the progress of a microprocessing technique in recent years, enhancement of the operation speed of a central processing unit (CPU) and the integration of a storage medium has been achieved. Thus, it has become possible to carry out high speed processing of a large amount of image data which has been impossible to handle. Also with regard to a light receiving device, high integration and miniaturization have been achieved, and high integration has made it possible to record with a higher spatial frequency and the miniaturization has achieved miniaturization of the entire camera.

However, such high integration and miniaturization as described above have decreased the light receiving area of individual photoelectric conversion elements and decreased the electric output power. This has given rise to a problem that the influence of noise increases. In order to prevent the problem, the aperture ratio of the optical system has been increased to increase the amount of light which reaches the light receiving device.

Or, very small lens elements of a microlens array have been located immediately in front of individual photoelectric conversion elements. While this microlens array introduces a ray, which is directed to a portion between adjacent ones of light receiving elements, to the light receiving elements, it provides a restriction to the position of the exit pupil of the lens system. If the position of the exit pupil of the lens system approaches the light receiving elements, namely, if the angle of a main ray, which comes to a light receiving element, with respect to the optical axis becomes great, then an off-axis ray directed to a peripheral portion of the screen defines a great angle with respect to the optical axis. As a result, the ray fails to come to the light receiving element, resulting in shortage in light amount.

Generally, a variable focal length lens system wherein the angle of view in a wide angle end state, in which the focal length is shortest, ranges approximately from 24 mm to 35 mm in a 35 mm equivalent angle of view and the angle of view in a 35 mm equivalent angle of view in a telephoto end state, in which the focal length is longest, exceeds 50 mm, is called standard variable focal length lens system.

As this standard variable focal length lens system, a variable focal length lens system of a positive-negative-positive-positive four-lens-group configuration such as those disclosed in Japanese Patent Laid-Open Nos. 2002-323656, 2003-241092 and 2007-114432 has been used frequently. Also a variable focal length lens system of a positive-negative-positive-negative-positive five-lens-group configuration such as those disclosed in Japanese Patent Laid-Open Nos. 2009-156891 and 2010-237453 has been used frequently.

The variable focal length lens system of a positive-negative-positive-positive four-lens-group configuration includes a first lens group having a positive refracting power, a second lens group having a negative refracting power, a third lens group having a positive refracting power and a fourth lens group having a positive refracting power, disposed in order from the object side to the image side.

The variable focal length lens system of a positive-negative-positive-negative-positive five-lens-group configuration includes a first lens group having a positive refracting power, a second lens group having a negative refracting power, a third lens group having a positive refracting power, a fourth lens group having a negative refracting power and a fifth lens group having a positive refracting power, disposed in order from the object side to the image side.

Also a variable focal length lens system of a positive-negative-negative-positive-positive five-lens-group configuration is known.

The variable focal length lens system of a positive-negative-positive-positive five-lens-group configuration includes a first lens group having a positive refracting power, a second lens group having a negative refracting power, a third lens group having a negative refracting power, a fourth lens group having a positive refracting power and a fifth lens group having a positive refracting power, disposed in order from the object side to the image side.

SUMMARY

However, in the variable focal length lens system of a positive-negative-positive-positive four-lens-group configuration, the second lens group bears most of the zooming effect.

Accordingly, if the refracting power of the second lens group is increased in order to achieve miniaturization or a higher zooming effect, then various aberrations which are caused by the second lens group cannot be corrected favorably and it is difficult to correct variations of off-axis aberrations involved in a variation of the positional state of the lenses.

In the variable focal length lens systems disclosed in Japanese Patent Laid-Open Nos. 2002-323656, 2003-241092 and 2007-114432, the third lens group is configured from a positive sub group and a negative sub group. Accordingly, the refracting power arrangement of the third and fourth lens groups is a positive sub group, a negative sub group and a positive sub group in order from the object side to the image side. Therefore, in a wide angle end state, an off-axis ray which passes the first lens group is displaced from the optical axis, resulting in increase of the lens diameter and increase of the overall lens length.

Also in the variable focal length lens system of a positive-negative-positive-negative-positive five-lens-group configuration, the refracting power arrangement of the third to fifth lens groups is positive, negative and positive refracting powers. Therefore, the refracting power arrangement of the positive-negative-positive-negative-positive five-lens-group configuration is same as that of the third and fourth lens groups of the variable focal length lens systems disclosed in Japanese Patent Laid-Open Nos. 2002-323656, 2003-241092 and 2007-114432. Accordingly, reduction of the lens diameter of the first lens group is difficult, and the overall lens length increases.

Therefore, it is desirable to provide a variable focal length lens system and an image pickup apparatus wherein the overall lens length is reduced.

According to an embodiment of the present technology, there is provided a variable focal length lens system including a first lens group having a positive refracting power, a second lens group having a negative refracting power, a third lens group having a negative refracting power, a fourth lens group having a positive refracting power, and a fifth lens group having a positive refracting power, the first, second, third, fourth and fifth lens groups being disposed in order from the object side to the image side, all of the first to fifth lens groups moving, when a positional state of the variable focal length lens system changes from a wide angle end state to a telephoto end state, such that an air gap between the first and second lens groups increases, an air gap between the second and third lens groups changes, an air gap between the third and fourth lens groups decreases, and an air gap between the fourth and fifth lens groups decreases, the fifth lens group being configured from a first sub lens group having a positive refracting power and a second sub lens group disposed on the image side with respect to the first sub lens group with an air gap left therebetween and having a negative refracting power, and the variable focal length lens system satisfying the following expression (1):

$$0.5 < Dsub/fw < 0.9 \qquad (1)$$

where Dsub is the air gap between the first and second sub lens groups on an optical axis, and fw is a focal length of the entire lens system in the wide angle end state.

With the variable focal length lens system, the air gap between the first and second sub lens groups on the optical axis is optimized.

Preferably the variable focal length lens system is configured such that the variable focal length lens system further satisfies the following expression (2):

$$1.2 < f5A/fw < 1.6 \qquad (2)$$

where f5A is a focal length of the first sub lens group.

Since the variable focal length lens system satisfies the conditional expression (2), an off-axis ray which passes the second sub lens group approaches the optical axis, and a negative spherical aberration arising from the first sub lens group is corrected favorably.

Preferably, the variable focal length lens system is configured such that the variable focal length lens system further satisfies the following expression (3):

$$-0.2 < \beta 5w < 0.1 \qquad (3)$$

where β5w is a lateral magnification of the fifth lens group.

Since the variable focal length lens system satisfies the conditional expression (3), divergence of an on-axis ray going out from the fourth lens group is suppressed, and the variation of an off-axis aberration arising when the positional state of the variable focal length lens system changes is corrected favorably.

Preferably, the variable focal length lens system is configured such that the second sub lens group is configured from two lenses including a negative lens and a positive lens disposed in order from the object side to the image side; and the variable focal length lens system further satisfies the following expression (4):

$$DsB/fw < 0.15 \qquad (4)$$

where DsB is an air gap between the negative lens and the positive lens of the second sub lens group on an optical axis.

Since the second sub lens group is configured from the two lenses including the negative lens and the positive lens disposed in order from the object side to the image side and the variable focal length lens system satisfies the conditional expression (4), an off-axis ray which passes the positive lens in the wide angle end state approaches the optical axis.

Preferably, the variable focal length lens system is configured such that an aperture stop is disposed between the third and fourth lens groups.

Since the aperture stop is disposed between the third and fourth lens groups, the diameter of the lenses of the lens groups is set appropriately.

Preferably, the variable focal length lens system is configured such that the third lens group moves upon short-distance focusing, and the third lens group is configured from a single lens; and the variable focal length lens system further satisfies the following expression (5):

$$-0.70 < fw/f12w < -0.35 \qquad (5)$$

where f12w is a combined focal length of the first and second lens groups in the wide angle end state.

In the variable focal length lens system, the third lens group moves upon short-distance focusing and the third lens group is configured from the single lens, and besides the variable focal length lens system further satisfies the conditional expression (5). Therefore, an off-axis ray incident to the first lens group in the wide angle end state approaches the optical axis. Consequently, optimization of the positive refracting power of the third lens group and reduction of the amount of movement of the third lens group upon short-distance focusing can be anticipated.

Preferably, the variable focal length lens system is configured such that the second lens group is configured from a negative lens having a concave face directed to the image side and a cemented lens including a negative lens and a positive lens cemented to each other, the negative lens and the cemented lens being disposed in order from the object side to the image side; and the variable focal length lens system further satisfies the following expression (6):

$$-0.30 < fw/Rt < -0.05 \qquad (6)$$

where Rt is a radius of curvature of the most object side face of the cemented lens of the second lens group.

In the variable focal length lens system, the second lens group is configured from the negative lens having the concave face directed to the image side and the cemented lens including the negative lens and the positive lens cemented to each other, which are disposed in order from the object side to the image side, and the variable focal length lens system further satisfies the following conditional expression (6). Therefore, an off-axis ray passing the first lens group approaches the optical axis.

According to another embodiment of the present technology, there is provided an image pickup apparatus including a variable focal length lens system, and an image pickup device configured to convert an optical image formed by the variable focal length lens system into an electric signal, the variable focal length lens system including a first lens group having a positive refracting power, a second lens group having a negative refracting power, a third lens group having a negative refracting power, a fourth lens group having a positive refracting power, and a fifth lens group having a positive refracting power, the first, second, third, fourth and fifth lens groups being disposed in order from the object side to the image side, all of the first to fifth lens groups moving, when a positional state of the variable focal length lens system changes from a wide angle end state to a telephoto end state, such that an air gap between the first and second lens groups increases, an air gap between the second and third lens groups changes, an air gap between the third and fourth lens groups decreases, and an air gap between the fourth and fifth lens groups decreases, the fifth lens group being configured from a first sub lens group having a positive refracting power and a second sub lens group disposed on the image side with respect to the first sub lens group with an air gap left therebetween and having a negative refracting power, and the variable focal length lens system satisfying the following expression (1):

$$0.5 < Dsub/fw < 0.9 \qquad (1)$$

where Dsub is the air gap between the first and second sub lens groups on an optical axis, and fw is a focal length of the entire lens system in the wide angle end state.

With the image pickup apparatus, the air gap between the first and second sub lens groups on the optical axis in the variable focal length lens system is optimized.

In summary, the variable focal length lens system and the image pickup apparatus of the embodiments of the present technology can achieve reduction of the overall length of the variable focal length lens system.

DETAILED DESCRIPTION OF THE PREFERRED EMBODIMENTS

Figure 1:
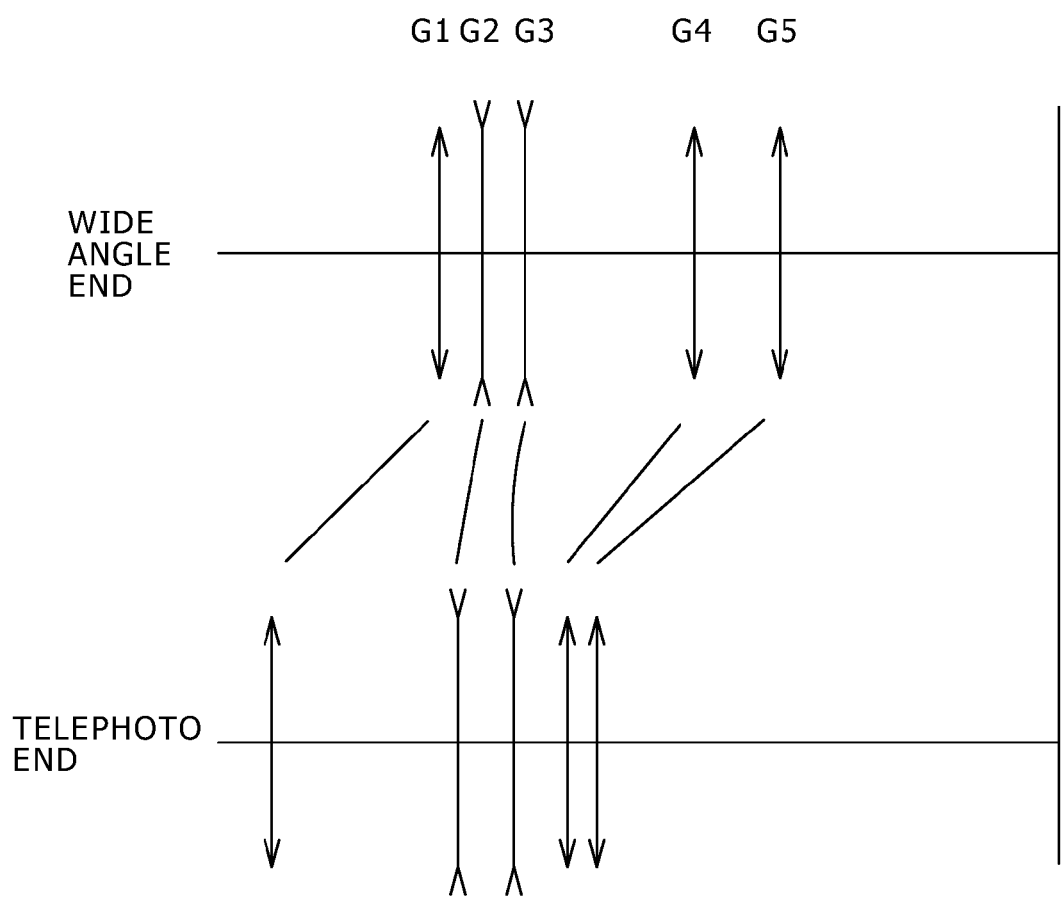
FIG. 1 is a view schematically illustrating arrangement of refracting powers of a variable focal length lens system and an image pickup apparatus according to the embodiments of the present technology together with FIGS. 2 to 17.

In the following, preferred embodiments of the present technology wherein it is applied to a variable focal length lens system and an image pickup apparatus are described.

[Configuration of the Variable Focal Length Lens System]

The variable focal length lens system of the embodiment of the present technology includes a first lens group having a positive refracting power, a second lens group having a negative refracting power, a third lens group having a negative refracting power, a fourth lens group having a positive refracting power, and a fifth lens group having a positive refracting power, disposed in order from the object side to the image side.

In the variable focal length lens system of the embodiment of the present technology, all of the first to fifth lens groups move, when a positional state of the zoom lens changes from a wide angle end state to a telephoto end state, such that an air gap between the first and second lens groups increases; an air gap between the second and third lens groups changes; an air gap between the third and fourth lens groups decreases; and an air gap between the fourth and fifth lens groups decreases.

First, functions of the lens groups which configure the variable focal length lens system of the embodiment of the present technology are described.

In the variable focal length lens system of the embodiment of the present technology, the first and second lens groups are disposed closely to each other in the wide angle end state. Therefore, an off-axis ray incident to the first lens group approaches the optical axis. As a result, the lens diameter can be reduced. Simultaneously, when the positional state of the zoom lens changes from the wide angle end state to the telephoto end state, since the air gap between the first and second lens groups increases, the off-axis ray passing the first lens group is directed away from the optical axis. In the embodiment of the present technology, this variation of the height of the off-axis ray is utilized to favorably correct the variation of the off-axis aberration caused by the variation of the positional state of the zoom lens.

Since the second and third lens groups have negative refracting powers, the two lens groups are located closely to each other in the wide angle end state so that off-axis ray incident to the first lens group is directed toward the optical axis. When the positional state of the zoom lens changes from the wide angle end state to the telephoto end state, the air gap between the second and third lens groups is changed to change the combined refracting power of the two lens groups thereby to effectively change the combined refracting power of the first to third lens groups.

To the fourth lens group, the ray diverged by the third lens group is incident. Therefore, the fourth lens group takes charge of correction principally of an on-axis aberration which is liable to occur with the incident ray.

Further, in the variable focal length lens system of the embodiment of the present technology, the fifth lens group is configured from a first sub lens group having a positive refracting power and a second sub lens group disposed on the image side with respect to the first sub lens group with an air gap left therebetween and having a negative refracting power.

The fifth lens group takes charge of a role of causing a ray to form an image. In the embodiment of the present technology, in order to reduce the overall length of the variable focal length lens system, the fifth lens group is configured from the first sub lens group disposed on the object side and having a positive refracting power, and the second sub lens group disposed on the image side and having a negative refracting power.

In the variable focal length lens system of the embodiment of the present technology having such a configuration as described above, attention is paid to a condition given below to achieve reduction of the overall length of the variable focal length lens system while a high zoom ratio is achieved.

This condition is "to appropriately set the air gap between the first and second sub lens groups."

In the embodiment of the present technology, in the wide angle end state, the air gap between the third and fourth lens groups is in an increased state. Accordingly, on the object side, the positive lens group, namely, the first lens group, and the two negative lens groups, namely, the second and third lens groups, are located. However, on the image side, the two positive lens groups, namely, the fourth and fifth lens groups, are located, and therefore, no negative lens group exists. Therefore, it is difficult to favorably correct a negative distortion aberration in the wide angle end state.

Therefore, the fifth lens group is configured from the first sub lens group having a positive refracting power and the second sub lens group disposed on the image side with respect to the first sub lens group and having a negative refracting power. By the configuration, a negative distortion aberration which is liable to appear in the wide angle end state is corrected favorably.

Further, since the first and second sub lens groups are located with an increased air gap, an off-axis ray which passes the second sub lens group passes away from the optical axis. As a result, a variation of a comatic aberration caused by a variation of the angle of view in the wide angle end state can be corrected favorably.

From the foregoing, the condition "to appropriately set the air gap between the first and second sub lens groups." is significant.

Now, the conditional expression and so forth are described.

The variable focal length lens system of the embodiment of the present technology satisfies the following expression (1):

$$0.5 < Dsub/fw < 0.9 \tag{1}$$

where Dsub is the air gap between the first and second sub lens groups on an optical axis, and fw is the focal length of the entire variable focal length lens system in the wide angle end state.

The conditional expression (1) defines the air gap between the first and second sub lens groups of the fifth lens group and defines numerical limitations of the condition described above.

If the air gap between the first and second sub lens groups of the fifth lens group becomes equal to or greater than the upper limit value of the conditional expression (1), then it becomes difficult to reduce the overall length of the variable focal length lens system while a predetermined back focus is assured.

On the contrary, if the air gap between the first and second sub lens groups of the fifth lens group becomes equal to or smaller than the lower limit value of the conditional expression (1), then performance degradation by mutual eccentricity of the first and second sub lens groups becomes excessively great. Consequently, it becomes difficult to assure stabilized mass production performances.

Thus, where the variable focal length lens system satisfies the conditional expression (1), the overall length of the variable focal length lens system can be reduced while a predetermined back focus is assured. Further, by reduction of the mutual eccentricity of the first and second sub lens groups, stabilized mass production performances can be assured.

According to the embodiment of the present technology, a variable focal length lens system very suitable for a lens system wherein the angle of view in the wide angle end state is 70 to 80 degrees, the zoom ratio is approximately five times and the F number in the wide angle end state is approximately F2.8 to F4.0 can be configured.

In the variable focal length lens system according to the embodiment of the present technology, in order to implement further enhancement in performance and miniaturization, preferably the variable focal length lens system further satisfies the following expression (2):

$$1.2 < f5A/fw < 1.6 \tag{2}$$

where f5A is a focal length of the first sub lens group.

The first sub lens group has a positive refracting power and principally takes charge of correction of a spherical aberration.

If the refracting power of the first sub lens group is increased, then the overall length of the variable focal length lens system can be reduced. However, it becomes difficult to favorably correct a spherical aberration caused by the first sub lens group. Further, performance degradation by mutual eccentricity of the first and second sub lens groups increases.

Therefore, it is significant to reduce the refracting power of the first sub lens group. However, if the refracting power of the first sub lens group is reduced excessively, then the overall length of the variable focal length lens system increases. Therefore, it is significant to set an appropriate focal length.

The conditional expression (2) defines the focal length of the first sub lens group.

If the focal length of the first sub lens group becomes equal to or greater than the upper limit value of the conditional expression (2), then an off-axis ray which passes the second sub lens group is spaced away from the optical axis. Therefore, the diameter of the rear lens which is a lens disposed on the most image side becomes great. If the diameter of the rear lens becomes great, then the diameter of the lens barrel for driving the movable lens groups becomes great, which is contradictory to miniaturization.

If the focal length of the first sub lens group becomes equal to or smaller than the lower limit value of the conditional expression (2), it becomes difficult to favorably correct a negative spherical aberration which arises from the first sub lens group. Therefore, it becomes difficult to achieve predetermined optical performances.

Thus, where the variable focal length lens system satisfies the conditional expression (2), an off-axis ray which passes the second sub lens group approaches the optical axis. Therefore, miniaturization can be anticipated. Further, it becomes possible to favorably correct a negative spherical aberration arising from the first sub lens group, and consequently, improvement in optical performances can be anticipated.

In the variable focal length lens system according to the embodiment of the present technology, in order to implement further miniaturization, preferably the variable focal length lens system further satisfies the following expression (3):

$$-0.2 < \beta 5w < 0.1 \quad (3)$$

where β5w is a lateral magnification of the fifth lens group.

Both of the fourth and fifth lens groups have positive refracting powers. Therefore, when the positional state of the variable focal length lens system changes, the air gap between them is changed to favorably correct a variation of an off-axis aberration arising from the variation of the positional state of the variable focal length lens system.

In order to improve this correction effect, in the embodiment of the present technology, the refracting power arrangement is set such that an on-axis ray to go out from the fourth lens group may be placed into a state proximate to that of parallel light.

In particular, even if the air gap between the fourth and fifth lens groups changes, the height of an on-axis ray does not change, and therefore, a variation of an on-axis aberration is small. In contrast, since an off-axis ray varies in height at which it passes, the off-axis aberration changes. Accordingly, the variation of an off-axis aberration arising from a variation of the positional state of the variable focal length lens system can be suppressed.

Where the combined focal length of the first to fourth lens groups is represented by f14 and the focal length of the overall variable focal length lens system is represented by f while the lateral magnification of the fifth lens group is represented by β5, the focal length f can be represented as $$f = f14 \cdot \beta 5$$

Since the focal length f of the entire variable focal length lens system is prescribed as a specification for design of the optical system and is a fixed value, the combined focal length f14 increases in proportion to a reciprocal number of the lateral magnification β5 of the fifth lens group.

The conditional expression (3) defines the lateral magnification of the fifth lens group.

If the lateral magnification of the fifth lens group becomes equal to or lower than the lower limit value of the conditional expression (3), then an on-axis ray going out from the fourth lens group is diverged. Therefore, the overall length of the variable focal length lens system becomes long and it becomes difficult to achieve reduction of the overall length of the variable focal length lens system.

On the contrary, if the lateral magnification of the fifth lens group becomes equal to or higher than the upper limit value of the conditional expression (3), it is difficult to favorably correct the variation of the off-axis aberration which arises when the positional state of the variable focal length lens system changes. Therefore, it becomes difficult to satisfy predetermined optical performances.

Thus, if the variable focal length lens system satisfies the conditional expression (3), then divergence of an on-axis ray going out from the fourth lens group is suppressed, and reduction of the overall length of the variable focal length lens system can be anticipated. Further, the variation of an off-axis aberration arising when the positional state of the variable focal length lens system changes can be corrected favorably, and improvement of the optical performances can be anticipated.

In the variable focal length lens system according to the embodiment of the present technology, in order to implement further improvement of the performances, preferably the second sub lens group is configured from two lenses including a negative lens and a positive lens disposed in order from the object side to the image side, and the variable focal length lens system further satisfies the following expression (4):

$$DsB/fw < 0.15 \quad (4)$$

where DsB is an air gap between the negative lens and the positive lens of the second sub lens group on an optical axis.

Through the second sub lens group, an off-axis ray passes away from the optical axis as described hereinabove.

In the embodiment of the present technology, the second sub lens group is configured from the two lenses including the negative lens and the positive lens, and the air gap between them is utilized to favorably correct the variation of the comatic aberration arising from a change of the angle of view.

If the focal length of the entire variable focal length lens system is equal to or greater than the upper limit value of the conditional expression (4), then in the wide angle end state, an off-axis ray which passes the positive lens is spaced away from the optical axis. Therefore, a significant comatic aberration arises in a peripheral portion of the screen, and this gives rise to degradation of the performances.

Thus, if the variable focal length lens system satisfies the conditional expression (4), then an off-axis ray which passes the positive lens in the wide angle end state approaches the optical axis. Consequently, it is possible to suppress appearance of a comatic aberration thereby to achieve improvement of the optical performances.

In the variable focal length lens system according to the embodiment of the present technology, in order to appropriately set the diameter of the lenses of the lens groups, preferably an aperture stop is disposed between the third and fourth lens groups.

Particularly in the case where the aperture stop is disposed on the object side in the proximity of the fourth lens group, the structure for holding the lenses which configure the fourth lens group can be simplified in configuration.

In the variable focal length lens system according to the embodiment of the present technology, preferably the third lens group moves upon short-distance focusing, and the third lens group is configured from a single lens, the variable focal length lens system further satisfying the following expression (5):

$$-0.70 < fw/f12w < -0.35 \quad (5)$$

where f12w is a combined focal length of the first and second lens groups in the wide angle end state.

In the embodiment of the present technology, the second lens group which is frequently configured from a single lens group is divided into two lens groups including a second lens group and a third lens group.

By utilizing the division of the second lens group into the two lens groups such that, upon short-distance focusing, the third lens group is moved, it is possible to compensate for the variation of the position of the image plane depending upon the image pickup object.

Particularly, in order to reduce the lens diameter of the first lens group and configure the third lens group from a single lens, preferably the conditional expression (5) is satisfied.

The conditional expression (5) defines the combined focal length of the first and second lens groups in the wide angle end state.

If the combined focal length of the first and second lens groups is equal to or longer than the upper limit value of the conditional expression (5), then an off-axis ray incident to the first lens group in the wide angle end state is spaced away from the optical axis. Consequently, the diameter of the variable focal length lens system becomes great. Further, since the positive refracting power of the third lens group is increased in order to assure a predetermined back focus, it becomes difficult to favorably correct a positive spherical aberration arising from the third lens group irrespective of the zoom position.

On the contrary, if the combined focal length is equal to or shorter than the lower limit value of the conditional expression (5), then the amount of movement of the third lens group upon short-distance focusing becomes very great. Therefore, the air gap between the first lens group and the aperture stop in the wide angle end state becomes great. Accordingly, the diameter of the lenses of the first lens group becomes great, and a comatic aberration appears significantly at a peripheral portion of the screen.

Thus, if the variable focal length lens system satisfies the conditional expression (5), then an off-axis ray incident to the first lens group in the wide angle end state approaches the optical axis, and reduction of the diameter of the associated lenses can be anticipated. Also, improvement of the optical performances by optimization of the positive refracting power of the third lens group and reduction of the amount of movement of the third lens group upon short-distance focusing can be anticipated.

In the variable focal length lens system according to the embodiment of the present technology, preferably the second lens group is configured from a negative lens having a concave face directed to the image side and a cemented lens including a negative lens and a positive lens cemented to each other, the negative lens and the cemented lens being disposed in order from the object side to the image side, and the variable focal length lens system further satisfies the following expression (6):

$$-0.30 < fw/Rt < -0.05 \quad (6)$$

where Rt is a radius of curvature of the most object side face of the cemented lens of the second lens group.

In the embodiment of the present technology, the negative lens disposed on the object side principally carries out correction of a field curvature while the cemented lens disposed on the image side principally carries out correction of a spherical aberration. Thus, aberration correction functions are carried out by the different lenses. Accordingly, by configuring the second lens group from the negative lens having a concave face directed to the image side and the cemented lens configured from the negative lens and the positive lens cemented to each other, a high performance can be anticipated by a comparatively small number of lenses.

Further, in order to more favorably correct the field curvature in the wide angle end state to achieve a high performance, preferably the conditional expression (6) is satisfied.

The conditional expression (6) defines the shape of the cemented lens of the second lens group.

If the focal length of the entire variable focal length lens system becomes equal to or smaller than the lower limit value of the conditional expression (6), then it becomes difficult to sufficiently correct the field curvature in the wide angle end state.

On the contrary, if the focal length of the entire variable focal length lens system becomes equal to or greater than the upper limit value of the conditional expression (6), then an off-axis ray which passes the first lens group is spaced away from the optical axis. Consequently, a comatic aberration appearing at a peripheral portion of the screen cannot be corrected sufficiently, and improvement of the performances cannot be anticipated.

Thus, if the variable focal length lens system satisfies the conditional expression (6), then the field curvature in the wide angle end state can be corrected sufficiently. Further, an off-axis ray which passes the first lens group approaches the optical axis, and a comatic aberration which appears at a peripheral portion of the screen can be corrected sufficiently. Consequently, improvement of the performances can be anticipated.

Further, by forming the negative lens located on the most object side in the second lens group as an aspheric lens, the variation of a comatic aberration arising from a change of the angle of view in the wide angle end state can be corrected favorably.

It is to be noted that, by moving the fourth lens group and the aperture stop integrally with each other when the positional state of the associated lenses changes, simplification of the lens barrel structure can be anticipated. On the contrary, by moving the aperture stop and the fourth lens group independently of each other, further improvement of a performance and the magnification can be anticipated.

In the embodiment of the present technology, in order to achieve both of a higher optical performance and miniaturization, preferably the lens groups are configured in the following manner.

Preferably, the first lens group is configured from a cemented lens of a negative lens and a positive lens, and a single positive lens disposed on the image side of the cemented lens, the cemented lens and the positive lens being disposed in order from the object side to the image side.

To the first lens group, an on-axis ray is incident with a great ray diameter particularly in the telephoto end state, and therefore, a negative spherical aberration is liable to occur. Further, since an off-axis ray is incident in a state in which it is spaced from the optical axis, an off-axis aberration is liable to appear.

In the embodiment of the present technology, since the cemented lens of the negative lens and the positive lens is located on the most object side of the first lens group, a negative spherical aberration and an on-axis chromatic aberration are corrected favorably. The single positive lens located on the image side of the cemented lens principally corrects the variation of the comatic aberration caused by a change of the angle of view favorably. By making the functions of the individual lenses definite, a higher optical performance can be implemented.

It is to be noted that, in order to achieve a higher performance, preferably the cemented lens of the first lens group is configured from two separated lenses including a negative lens and a positive lens.

The third lens group is located in the proximity of the aperture stop and principally carries out correction of a spherical aberration.

Further, preferably the third lens group moves so as to compensate for a variation of the image plane position by a change of the distance of the image pickup object. Particularly, in order to achieve increase of the speed of an automatic focusing operation, preferably the single negative lens of the third lens group is configured as an aspheric lens.

Preferably, the fourth lens group is configured from a positive lens of a biconvex shape and a cemented lens of a positive lens of a biconvex shape and a negative lens of a biconcave shape.

In the embodiment of the present technology, in order to reduce the overall length of the variable focal length lens system, a negative lens is located on the most image side. Simultaneously, in order to correct a negative spherical aberration, preferably the positive lens located on the object side is formed as an aspheric lens.

It is to be noted that, in the embodiment of the present technology, also it is possible to locate the aperture stop in the fourth lens group. In particular, it is possible to locate the aperture stop between the positive lens of a biconvex shape and the cemented lens of the positive lens of a biconvex shape and the negative lens of a biconcave shape.

Further, in the embodiment of the present technology, in order to more favorably suppress appearance of a chromatic aberration, preferably at least one of the lenses of the first lens group is formed from a glass material having a high extraordinary dispersion property. Particularly, by forming the positive lens of the cemented lens from among the lenses which configure the first lens group from a glass material having a high extraordinary dispersion property, a secondary dispersion which appears at a central portion of the screen in the telephoto end state can be corrected favorably.

Further, in order to favorably correct a chromatic aberration in the wide angle end state, preferably at least one of the lenses of the fifth lens group is formed from a glass material of a high extraordinary dispersion property.

Particularly, in the embodiment of the present technology, by shifting one of the lens groups which configure the lens system or some of the lenses of one of the lens groups in a direction substantially perpendicular to the optical axis, the image position can be shifted.

Particularly, in the embodiment of the present technology, the aberration variation when the positive lens disposed on the object side in the fifth lens group is shifted in a direction substantially perpendicular to the optical axis is small.

It is possible to combine the variable focal length lens system, which can shift an image, with a detection system, an arithmetic operation system and a driving system so as to function as a vibration-proof lens system which corrects a shake of an image by a camera shake which occurs upon shutter release or the like.

The detection system detects a deflection angle of the camera and outputs camera shake information. The arithmetic operation system outputs lens position information necessary to correct the camera shake based on the camera shake information. An image-shiftable lens system can shift one of the lens groups which configure the lens system or some of the lenses of one of the lens groups as a shift lens group in a direction substantially perpendicular to the optical axis. The image-shiftable lens system carries out correction so that a performance change which occurs when the shift lens group is shifted is minimized. The driving system provides driving force to the shift lens group based on the lens position information.

Also it is possible to locate a low-pass filter in order to prevent appearance of moiré stripes on the image side of the lens system or to locate an infrared ray cutting filter in response to a spectral sensitivity characteristic of the light receiving element.

[Embodiments of the Variable Focal Length Lens System]

In the following, variable focal length lens systems according to embodiments of the present technology and numerical value examples wherein particular numerical values are applied to the variable focal length lens system are described with reference to the accompanying drawings and tables given hereinbelow.

It is to be noted that the symbols used in the tables and the following description have the following meanings and so forth.

"Face distance" is an axial distance between an ith face and an i+1th face, namely, a thickness of a lens at the center or an air gap. "Refractive index" and "Abbe number" are a refractive index and an Abbe number of lenses beginning with the ith face at the d-line ($\lambda$=587.6 nm), respectively.

"ASP" of the "Face distance" represents that the face is an aspheric face; "0.0000" of "Radius of curvature" represents that the face is a flat face; "Di" of the "Face distance" represents that the face distance is a variable distance; and "BF" represents a back focus.

"$\kappa$" is the conic constant, and "A4," "A6," "A8" and "A10" are the fourth, sixth, eighth and tenth order aspheric coefficients, respectively.

"f" is the focal length; "2$\omega$" the angle of view; and "Fno" the F number.

It is to be noted that, in the tables given below in which the aspheric constant is included, "E-n" represents an exponential notation to the base 10, namely "$10^{-n}$," and for example, "0.12345E-05" represents "$0.12345 \times 10^{-5}$"

The variable focal length lens systems used in the embodiments include an aspheric lens face. Where "x" is the distance or sag amount in the direction of the optical axis from the vertex of the lens face; "y" the height, namely, the image height, in a direction perpendicular to the direction of the optical axis; "c" the paraxial radius of curvature at the vertex of the lens, namely, a reciprocal number to the radius of curvature; "$\kappa$" the conic constant; and "Ai" the ith-order aspheric constant, the aspheric face shape is defined by the following expression 1:

$$x = \frac{cy^2}{1 + [1-(1+\kappa)c^2y^2]1/2} + A4y^4 + A6y^6 + \ldots \quad \text{[Expression 1]}$$

The variable focal length lens systems to be described below are configured from a first lens group G1 having a positive refracting power, a second lens group G2 having a negative refracting power, a third lens group G3 having a negative refracting power, a fourth lens group G4 having a positive refracting power, and a fifth lens group G5 having a positive refracting power, located in order from the object side to the image side.

Further, in the variable focal length lens systems to be described below, all of the first to fifth lens groups move, when the positional state of the variable focal length lens system changes from the wide angle end state to the telephoto end state, such that, as illustrated in FIG. 1, the air gap between the first and second lens groups G1 and G2 increases; the air gap between the second and third lens groups G2 and G3 changes; the air gap between the third and fourth lens groups G3 and G4 decreases; and the air gap between the fourth and fifth lens groups G4 and G5 decreases.

Further, in the variable focal length lens systems to be described below, the fifth lens group G5 is configured from a first sub lens group GA having a positive refracting power and a second sub lens group GB disposed on the image side with respect to the first sub lens group with an air gap left therebetween and having a negative refracting power.

<First Embodiment>

Figure 2:
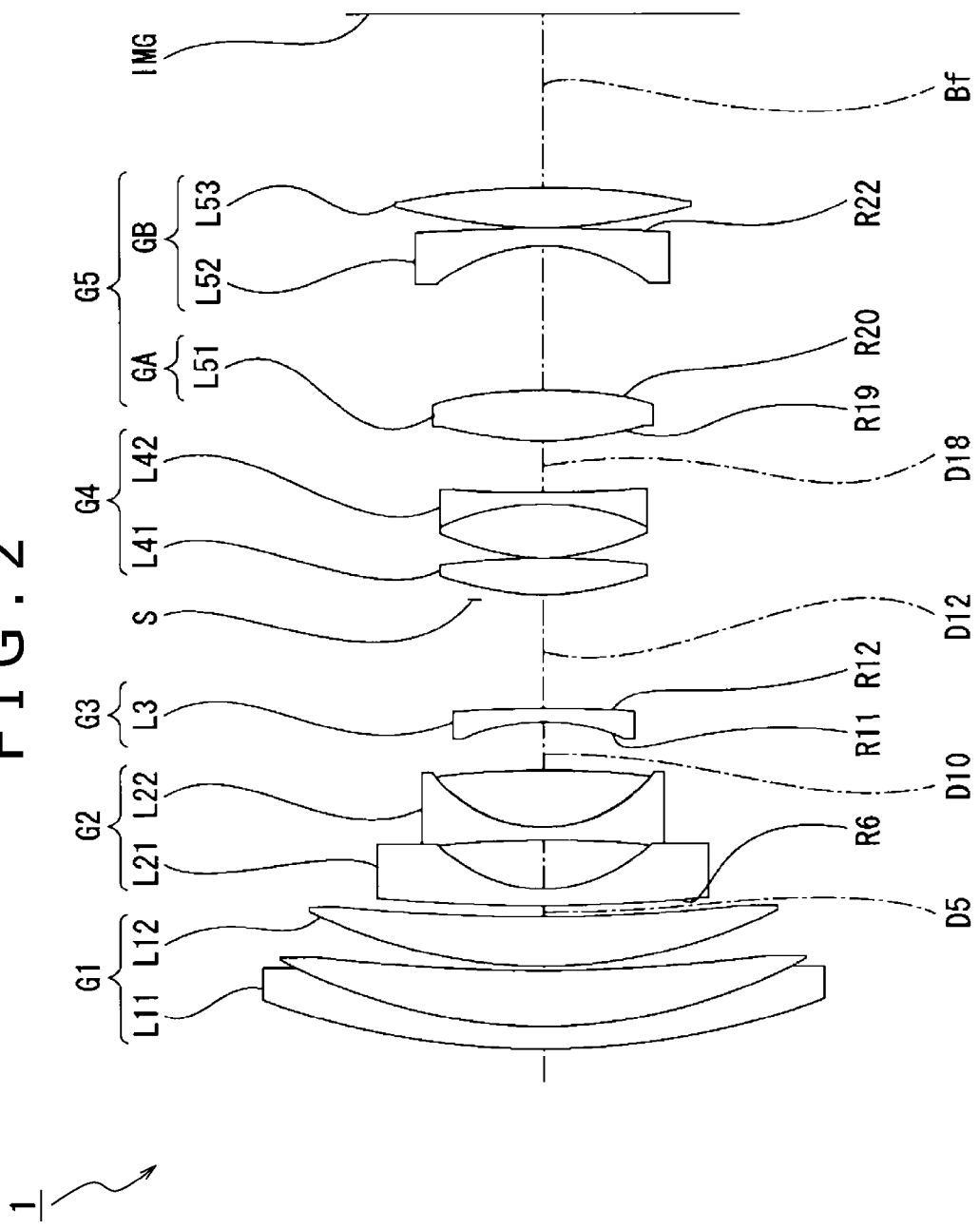
FIG. 2 is a schematic view showing a lens configuration of a variable focal length lens system according to a first embodiment of the present technology.

FIG. 2 shows a lens configuration of a variable focal length lens system 1 according to a first embodiment of the present technology.

The variable focal length lens system 1 has a zoom ratio of 4.71 times.

The first lens group G1 includes a cemented lens L11 of a negative lens of a meniscus shape having a convex face directed to the object side and a positive lens of a meniscus shape having a convex face directed to the object side, and a positive lens L12 of a meniscus shape having a convex face directed to the object side. The cemented lens L11 and the positive lens L12 are located in order from the object side to the image side.

The second lens group G2 includes a negative lens L21 of a meniscus shape having a convex face directed to the object side, and a cemented lens L22 of a negative lens of a biconcave shape and a positive lens of a biconvex shape. The negative lens L21 and the cemented lens L22 are located in order from the object side to the image side.

The third lens group G3 is configured from a negative lens L3 of a meniscus shape having a concave face directed to the object side.

The fourth lens group G4 is configured from a positive lens L41 of a biconvex shape and a cemented lens L42 of a biconvex lens and a biconcave lens. The positive lens L41 and the cemented lens L42 are located in order from the object side to the image side.

The fifth lens group G5 is configured from a positive lens L51 of a biconvex shape, a negative lens L52 of a meniscus shape having a concave face directed to the object side, and a positive lens L53 of a biconvex shape. The positive lens L51, negative lens L52 and positive lens L53 are located in order from the object side to the image side.

The fifth lens group G5 is configured from a first sub lens group GA having a positive refracting power and a second sub lens group GB having a negative refracting power. The first sub lens group GA and the second sub lens group GB are located in order from the object side to the image side. The first sub lens group GA is configured from the positive lens L51, and the second sub lens group GB is configured from the negative lens L52 and the positive lens L53.

Between the negative lens L3 of the third lens group G3 and the positive lens L41 of the fourth lens group G4, an aperture stop S is located in the proximity of the positive lens L41. The aperture stop S is moved integrally with the fourth lens group G4 when the positional state of the variable focal length lens system 1 changes.

A low-pass filter not shown is located between the fifth lens group G5 and an image plane IMG.

Table 1 indicates lens data of a numerical value example 1 wherein particular numerical values are applied to the variable focal length lens system 1 of the first embodiment.

TABLE 1

| Face number | Radius of curvature | Face distance | Refractive index | Abbe number |
|---|---|---|---|---|
| 1 | 64.9872 | 1.50 | 1.92286 | 20.80 |
| 2 | 39.2026 | 4.49 | 1.59282 | 68.63 |
| 3 | 161.2682 | 0.10 | | |
| 4 | 37.1319 | 3.97 | 1.75500 | 52.30 |
| 5 | 147.9348 | (D5) | | |
| 6(ASP) | 142.3818 | 1.40 | 1.83400 | 37.36 |
| 7 | 11.5824 | 3.81 | | |
| 8 | −77.8738 | 0.90 | 1.77250 | 49.62 |
| 9 | 10.3837 | 4.43 | 1.84666 | 23.83 |
| 10 | −73.6708 | (D10) | | |
| 11(ASP) | −16.2254 | 0.95 | 1.69680 | 55.34 |
| 12(ASP) | −212.0156 | (D12) | | |
| 13(Aperture stop) | 0.0000 | 0.40 | | |
| 14 | 20.4442 | 2.77 | 1.59282 | 68.63 |
| 15 | −65.0686 | 0.20 | | |
| 16 | 17.8247 | 4.09 | 1.49700 | 81.60 |
| 17 | −17.9369 | 0.90 | 1.90366 | 31.13 |
| 18 | 130.1516 | (D18) | | |
| 19(ASP) | 22.2006 | 4.00 | 1.58913 | 61.25 |
| 20(ASP) | −33.0262 | 11.04 | | |
| 21 | −12.9151 | 1.40 | 1.91082 | 35.25 |
| 22(ASP) | −50.9720 | 0.18 | | |
| 23 | 42.6426 | 3.07 | 1.75520 | 27.53 |
| 24 | −60.0014 | (Bf) | | |

In the variable focal length lens system 1, the face of the negative lens L21 of the second lens group G2 on the object side, namely, the sixth face, the opposite faces of the negative lens L3 of the third lens group G3, namely, the 11th and 12th faces, the opposite faces of the positive lens L51 of the fifth lens group G5, namely, the 19th and 20th faces, and the face of the negative lens L52 of the fifth lens group G5 on the image side, namely, the 22nd face, are formed as aspheric faces.

The fourth-, sixth-, eighth- and tenth-order aspheric coefficients A4, A6, A8 and A10 of the aspheric faces in the numerical value example 1 are indicated in Table 2 together with the conic constant K.

TABLE 2

| Face number | K | A4 | A6 | A8 | A10 |
|---|---|---|---|---|---|
| 6 | 10.0000 | 0.129508E−04 | −0.327050E−07 | 0.233610E−09 | −0.797594E−12 |
| 11 | 0.0000 | −0.257674E−04 | −0.171718E−06 | 0.288656E−08 | −0.545824E−10 |
| 12 | 0.0000 | −0.339268E−04 | 0.000000E+00 | 0.000000E+00 | 0.000000E+00 |
| 19 | 0.0000 | −0.680801E−04 | −0.189726E−06 | −0.133019E−08 | 0.173523E−11 |
| 20 | 0.0000 | −0.122738E−04 | −0.330030E−06 | 0.000000E+00 | 0.000000E+00 |
| 22 | 0.0000 | 0.709791E−04 | 0.196619E−06 | −0.102451E−08 | −0.110974E−11 |

Upon zooming between the wide angle end state and the telephoto end state of the variable focal length lens system 1, the face distance D5 between the first lens group G1 and the second lens group G2, the face distance D10 between the second lens group G2 and the third lens group G3, the face distance D12 between the third lens group G3 and the fourth lens group G4, the face distance D18 between the fourth lens group G4 and the fifth lens group G5 and the back focus Bf change.

The variations of the face distances in the numerical value example 1 in the wide angle end state, a first intermediate focus position state, a second intermediate focus position state and the telephoto end state are indicated in Table 3 together with the focal length f, angle 2ω of view and F number Fno.

TABLE 3

|  | Wide angle end | First intermediate focal length | Second intermediate focal length | Telephoto end |
|---|---|---|---|---|
| f | 16.4800 | 28.9780 | 44.9999 | 77.5997 |
| 2ω | 42.0240 | 26.0770 | 17.6529 | 10.6490 |
| Fno | 3.5960 | 3.9945 | 4.3926 | 4.6958 |
| D5 | 0.8000 | 8.4432 | 13.8213 | 21.4017 |
| D10 | 3.7968 | 3.5566 | 3.2104 | 3.7968 |
| D12 | 8.4905 | 4.8844 | 2.8257 | 0.6000 |
| D18 | 4.0127 | 2.4642 | 1.7129 | 1.2000 |
| Bf | 13.3000 | 21.6226 | 29.5775 | 38.4013 |

Figure 3:
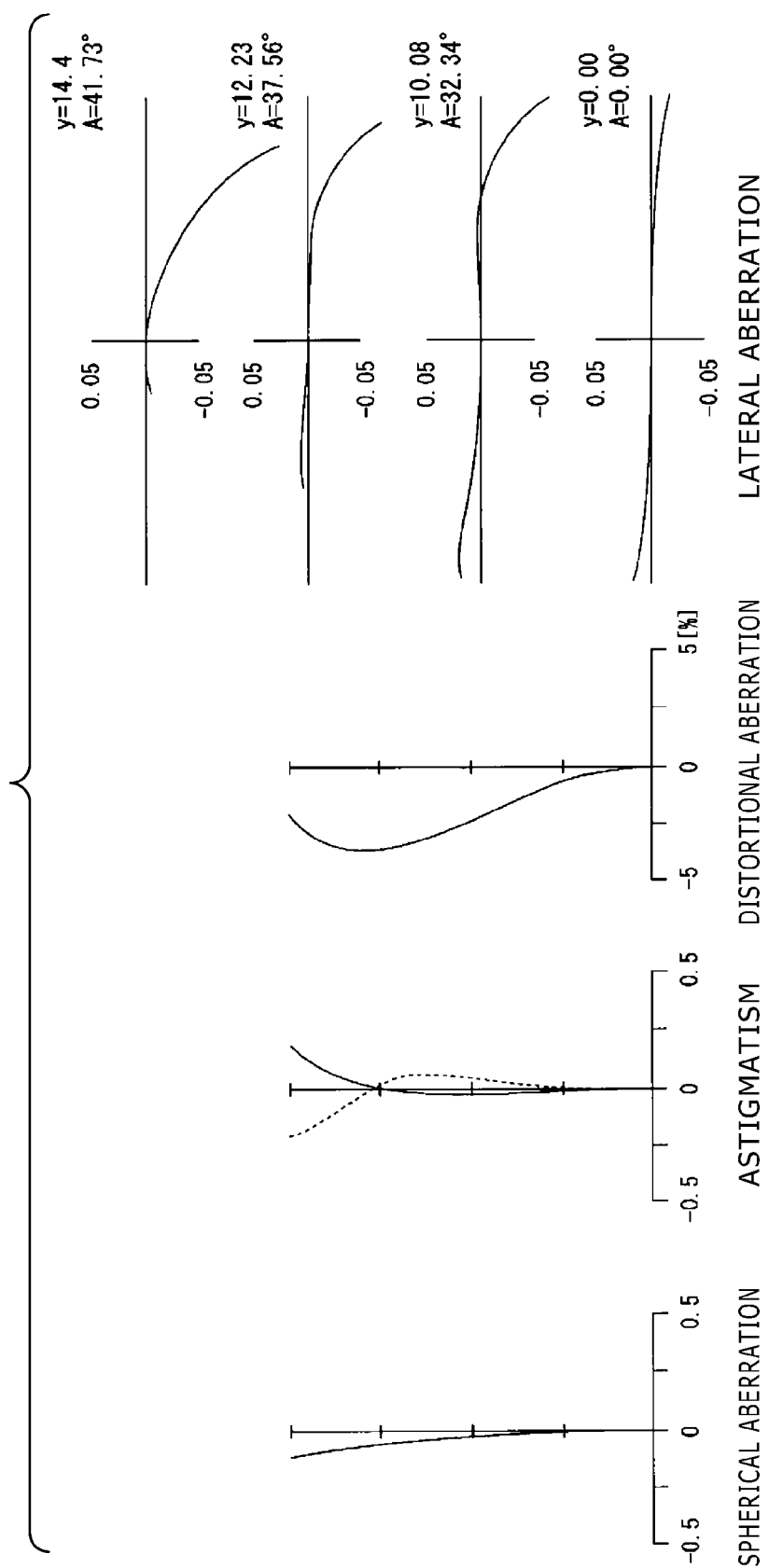
FIG. 3 is a diagrammatic view illustrating a spherical aberration, an astigmatism, a distortional aberration and lateral aberrations in a wide angle end state of the variable focal length lens system of FIG. 2 together with FIGS. 4 to 6 according to a numerical value example wherein particular numerical values are applied to the variable focal length lens system.
Figure 4:
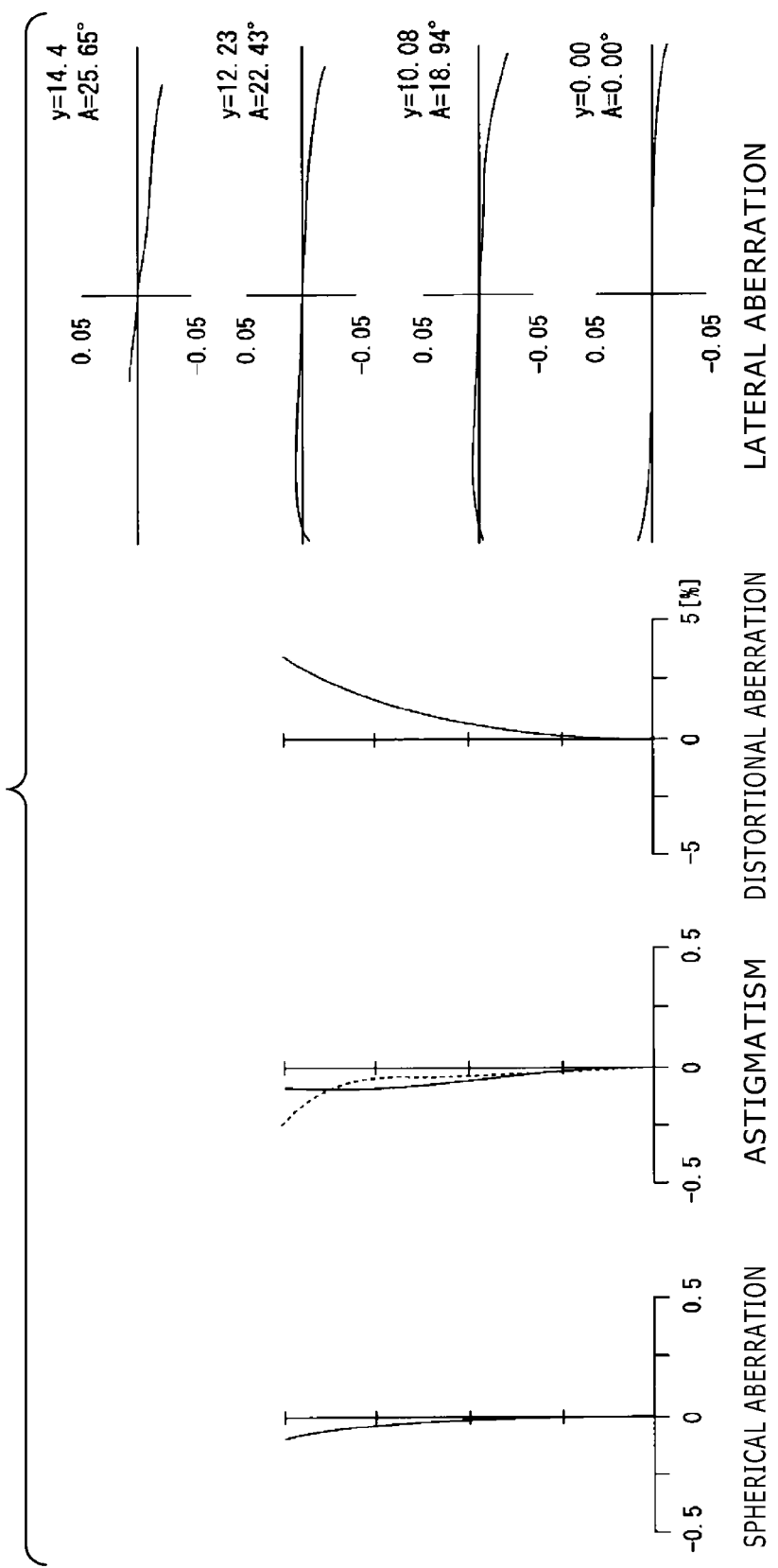
FIG. 4 is a similar view but illustrating a spherical aberration, an astigmatism, a distortional aberration and lateral aberrations in a first intermediate focal length state of the variable focal length lens system of FIG. 2.
Figure 5:
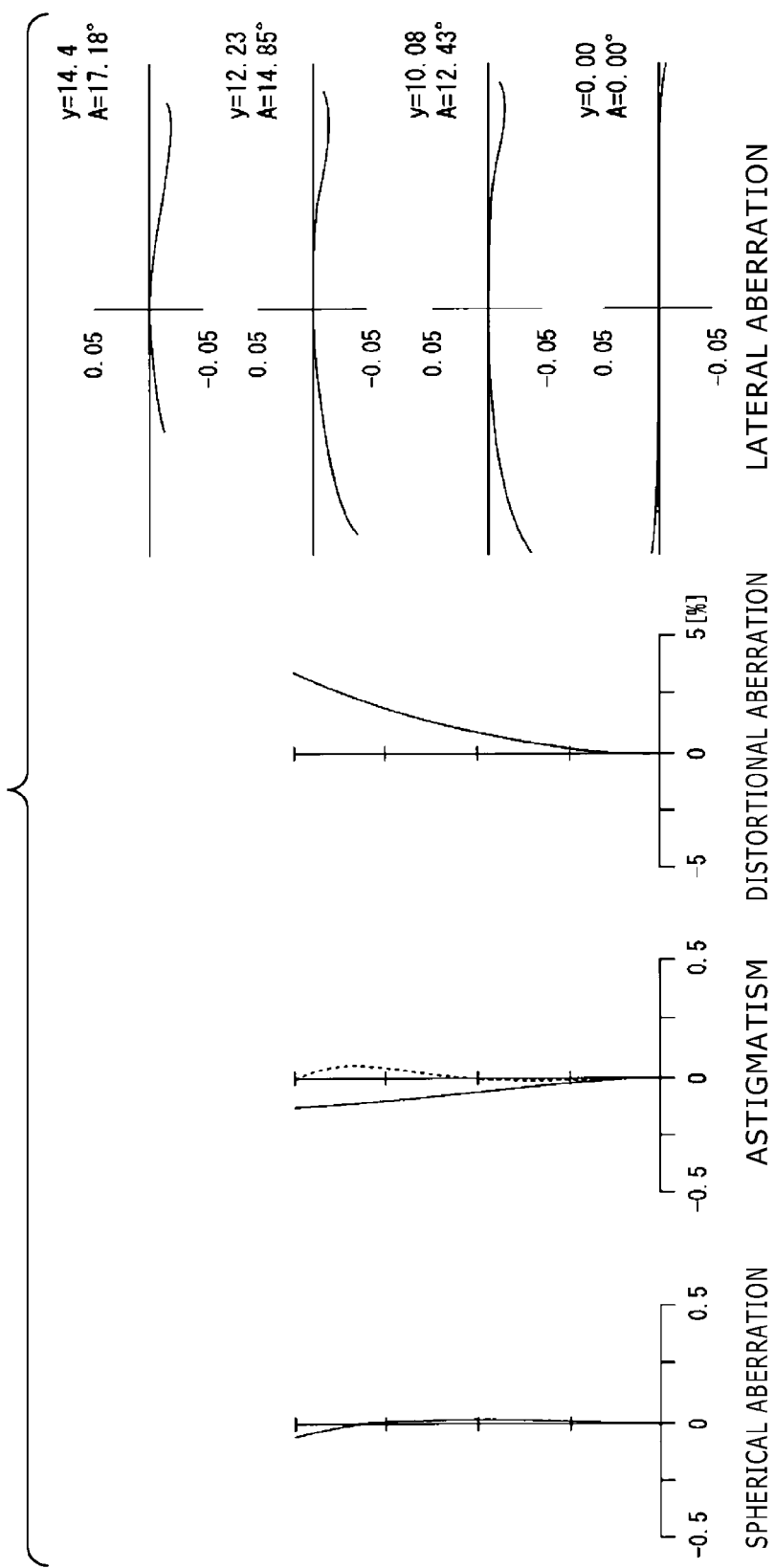
FIG. 5 is a similar view but illustrating a spherical aberration, an astigmatism, a distortional aberration and lateral aberrations in a second intermediate focal length state of the variable focal length lens system of FIG. 2.
Figure 6:
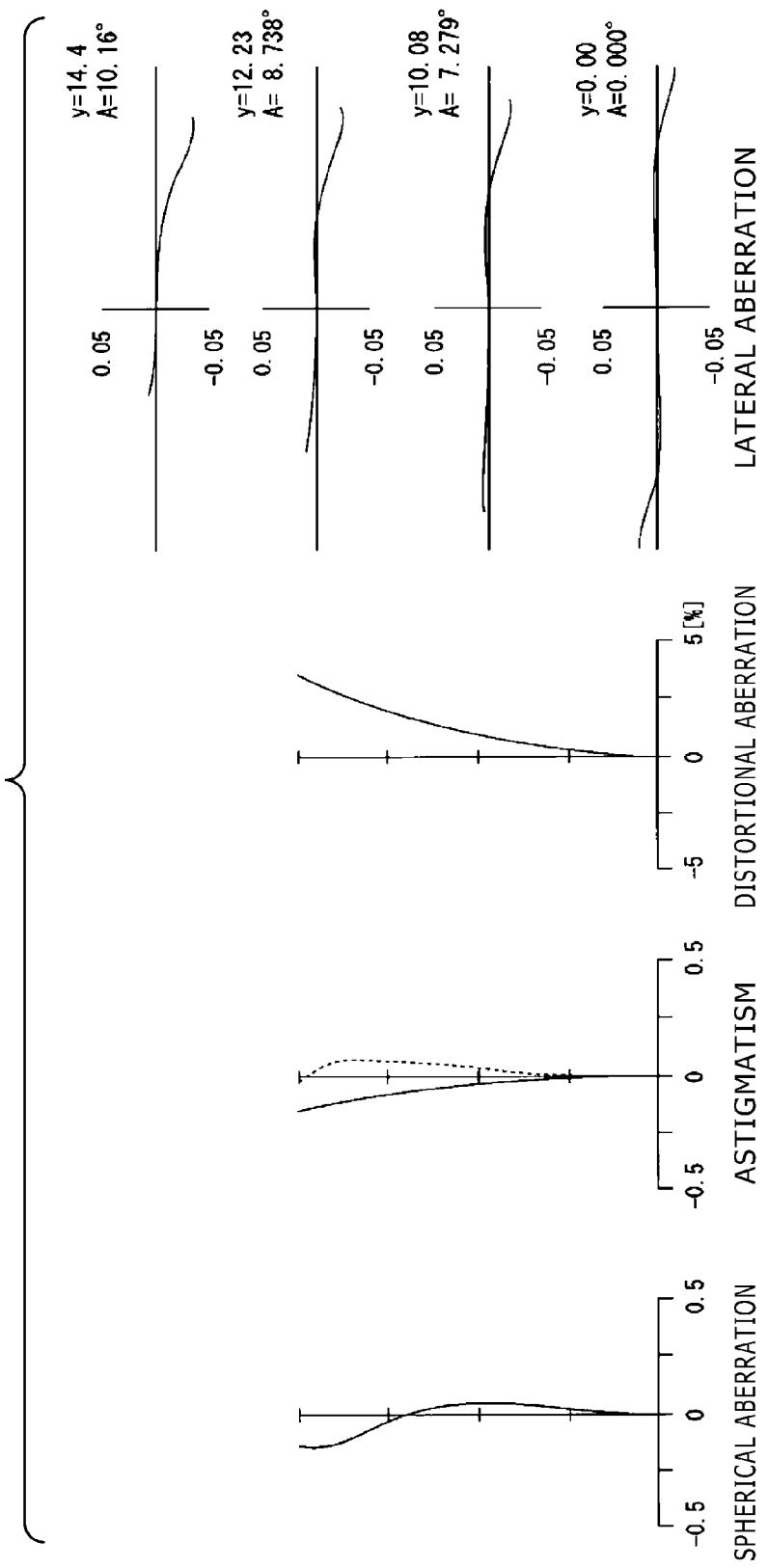
FIG. 6 is a similar view but illustrating a spherical aberration, an astigmatism, a distortional aberration and lateral aberrations in a telephoto end state of the variable focal length lens system of FIG. 2.

Various aberrations in the numerical value example 1 are illustrated in FIGS. 3 to 6. FIG. 3 illustrates the aberrations in an infinitely remotely focused state in the wide angle end state, FIG. 4 the aberrations in an infinitely remotely focused state in a first intermediate focus position state, FIG. 5 the aberrations in an infinitely remotely focused state in a second intermediate focus position state, and FIG. 6 the aberrations in an infinitely remotely focused state in the telephoto end state.

In FIGS. 3 to 6, in the spherical aberration diagrams, the axis of ordinate indicates the ratio of the spherical aberration to the open F value and the axis of abscissa indicates the defocus amount. Further, a curve indicates values on the d line (wavelength: 587.56 nm). In the astigmatism diagrams, the axis of ordinate indicates the angle of view and the axis of abscissa indicates the defocus amount. Further, a solid line curve indicates values on the sagittal image plane of the d line; and a broken line curve indicates values on the meridional image plane of the d line. In the distortional aberration diagrams, the axis of ordinate indicates the angle of view and the axis of abscissa indicates %, and a curve indicates values on the d line.

From the aberration diagrams, it is apparent that, in the numerical value example 1, the aberrations are corrected favorably and a superior image formation performance is exhibited.

<Second Embodiment>

Figure 7:
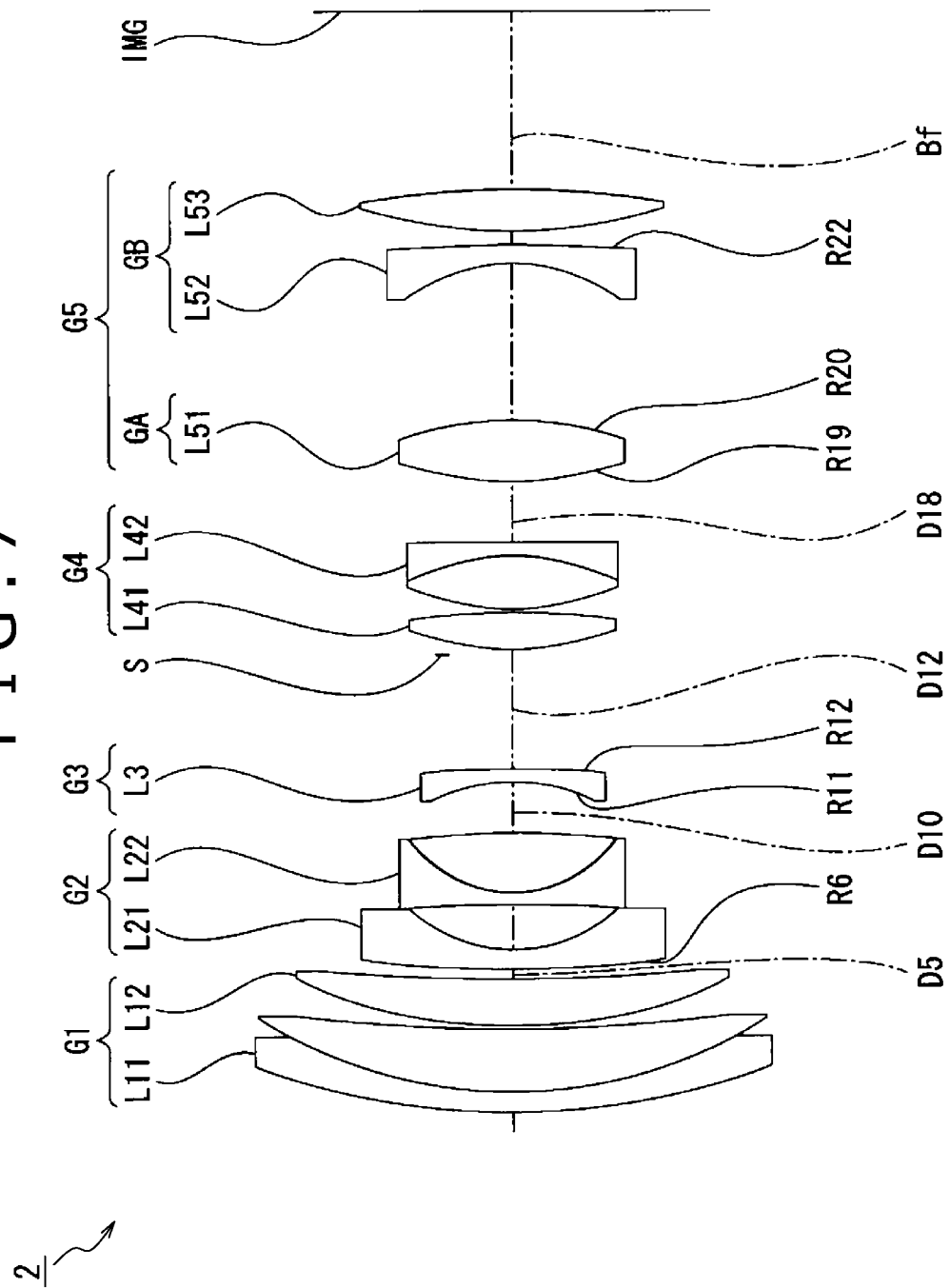
FIG. 7 is a schematic view showing a lens configuration of a variable focal length lens system according to a second embodiment of the present technology.

FIG. 7 shows a lens configuration of a variable focal length lens system 2 according to a second embodiment of the present technology.

The variable focal length lens system 2 has a zoom ratio of 5.00 times.

The first lens group G1 includes a cemented lens L11 of a negative lens of a meniscus shape having a convex face directed to the object side and a positive lens of a meniscus shape having a convex face directed to the object side, and a positive lens L12 of a meniscus shape having a convex face directed to the object side. The cemented lens L11 and the positive lens L12 are located in order from the object side to the image side.

The second lens group G2 includes a negative lens L21 of a meniscus shape having a convex face directed to the object side, and a cemented lens L22 of a negative lens of a biconcave shape and a positive lens of a biconvex shape. The negative lens L21 and the cemented lens L22 are located in order from the object side to the image side.

The third lens group G3 is configured from a negative lens L3 of a meniscus shape having a concave face directed to the object side.

The fourth lens group G4 is configured from a positive lens L41 of a biconvex shape and a cemented lens L42 of a biconvex lens and a biconcave lens. The positive lens L41 and the cemented lens L42 are located in order from the object side to the image side.

The fifth lens group G5 is configured from a positive lens L51 of a biconvex shape, a negative lens L52 of a meniscus shape having a concave face directed to the object side, and a positive lens L53 of a biconvex shape. The positive lens L51, negative lens L52 and positive lens L53 are located in order from the object side to the image side.

The fifth lens group G5 is configured from a first sub lens group GA having a positive refracting power and a second sub lens group GB having a negative refracting power. The first sub lens group GA and the second sub lens group GB are located in order from the object side to the image side. The first sub lens group GA is configured from the positive lens L51, and the second sub lens group GB is configured from the negative lens L52 and the positive lens L53.

Between the negative lens L3 of the third lens group G3 and the positive lens L41 of the fourth lens group G4, an aperture stop S is located in the proximity of the positive lens L41. The aperture stop S is moved integrally with the fourth lens group G4 when the positional state of the variable focal length lens system 2 changes.

A low-pass filter not shown is located between the fifth lens group G5 and an image plane IMG.

Table 4 indicates lens data of a numerical value example 2 wherein particular numerical values are applied to the variable focal length lens system 2 of the second embodiment.

TABLE 4

| Face number | Radius of curvature | Face distance | Refractive index | Abbe number |
|---|---|---|---|---|
| 1 | 60.0874 | 1.50 | 1.92286 | 20.80 |
| 2 | 37.8102 | 4.76 | 1.59282 | 68.63 |
| 3 | 148.4004 | 0.10 | | |
| 4 | 40.8141 | 3.72 | 1.75500 | 52.30 |
| 5 | 181.6958 | (D5) | | |
| 6(ASP) | 178.0128 | 1.40 | 1.88300 | 40.80 |
| 7 | 12.1094 | 3.47 | | |
| 8 | −117.8113 | 0.90 | 1.78800 | 47.40 |
| 9 | 10.4517 | 4.36 | 1.84666 | 23.83 |
| 10 | −84.3573 | (D10) | | |
| 11(ASP) | −16.0770 | 1.00 | 1.69680 | 55.34 |
| 12(ASP) | −180.2758 | (D13) | | |
| 13(Aperture stop) | 0.0000 | 0.40 | | |
| 14 | 22.6997 | 2.76 | 1.59282 | 68.63 |
| 15 | −67.8393 | 0.20 | | |
| 16 | 19.7800 | 4.20 | 1.49700 | 81.60 |
| 17 | −17.9552 | 0.90 | 1.90366 | 31.13 |
| 18 | 385.8833 | (D19) | | |
| 19(ASP) | 23.5266 | 4.50 | 1.58913 | 61.25 |
| 20(ASP) | −30.6986 | 11.87 | | |
| 21 | −14.8324 | 1.40 | 1.91082 | 35.25 |
| 22(ASP) | −61.6163 | 1.10 | | |
| 23 | 43.2855 | 3.18 | 1.72825 | 28.32 |
| 24 | −76.3547 | (Bf) | | |

In the variable focal length lens system 2, the face of the negative lens L21 of the second lens group G2 on the object side, namely, the sixth face, the opposite faces of the negative lens L3 of the third lens group G3, namely, the 11th and 12th faces, the opposite faces of the positive lens L51 of the fifth lens group G5, namely, the 19th and 20th faces, and the face of the negative lens L52 of the fifth lens group G5 on the image side, namely, the 22nd face, are formed as aspheric faces.

The fourth-, sixth-, eighth- and tenth-order aspheric coefficients A4, A6, A8 and A10 of the aspheric faces in the numerical value example 2 are indicated in Table 5 together with the conic constant K.

TABLE 5

| Face number | κ | A4 | A6 | A8 | A10 |
|---|---|---|---|---|---|
| 6 | 10.0000 | 0.131552E−04 | −0.352217E−07 | 0.273237E−09 | −0.108702E−11 |
| 11 | 0.0000 | −0.201846E−04 | −0.131592E−06 | 0.203237E−08 | −0.374084E−10 |
| 12 | 0.0000 | −0.295525E−04 | 0.000000E+00 | 0.000000E+00 | 0.000000E+00 |
| 19 | 0.0000 | −0.582314E−04 | −0.129153E−06 | −.944449E−09 | 0.209048E−11 |
| 20 | 0.0000 | −0.583072E−05 | −0.235366E−06 | 0.000000E+00 | 0.000000E+00 |
| 22 | 0.0000 | 0.581462E−04 | 0.156826E−06 | −0.819295E−09 | −0.132877E−12 |

Upon zooming between the wide angle end state and the telephoto end state of the variable focal length lens system 2, the face distance D5 between the first lens group G1 and the second lens group G2, the face distance D10 between the second lens group G2 and the third lens group G3, the face distance D12 between the third lens group G3 and the fourth lens group G4, the face distance D18 between the fourth lens group G4 and the fifth lens group G5 and the back focus Bf change.

The variations of the face distances in the numerical value example 2 in the wide angle end state, a first intermediate focus position state, a second intermediate focus position state and the telephoto end state are indicated in Table 6 together with the focal length f, angle 2ω of view and F number Fno.

TABLE 6

|  | Wide angle end | First intermediate focal length | Second intermediate focal length | Telephoto end |
|---|---|---|---|---|
| f | 16.4800 | 32.0617 | 49.9743 | 82.4498 |
| 2ω | 42.1951 | 23.5370 | 15.6381 | 9.5782 |
| Fno | 3.5990 | 4.1029 | 4.7405 | 4.7016 |
| D5 | 0.8000 | 9.3096 | 14.2660 | 23.0908 |
| D10 | 3.8772 | 3.5861 | 3.2778 | 3.8772 |
| D12 | 8.6538 | 4.3944 | 2.3958 | 0.6000 |
| D18 | 4.6406 | 2.8014 | 2.1294 | 1.5000 |
| Bf | 13.3000 | 24.8954 | 35.2518 | 41.2035 |

Figure 8:
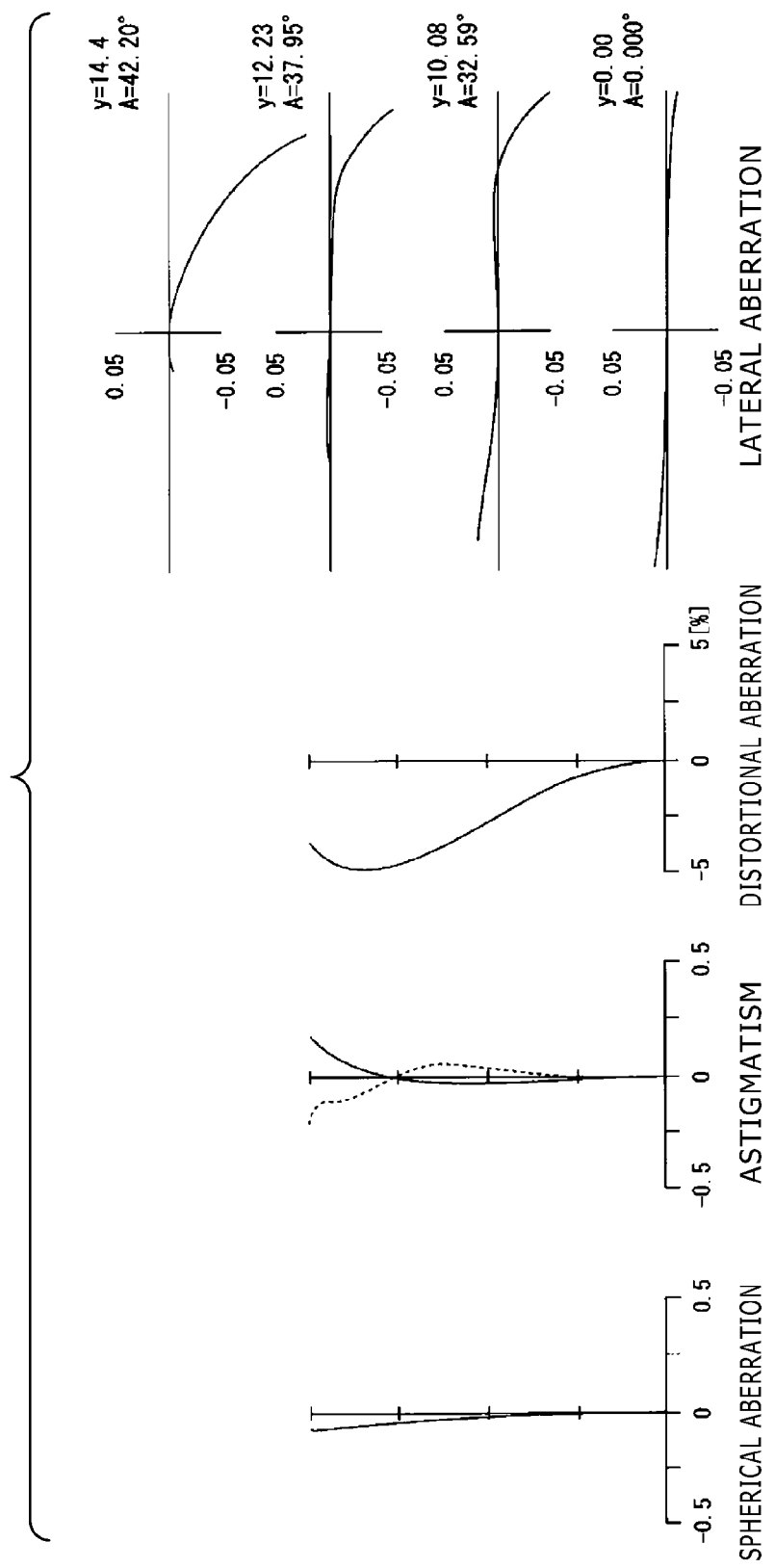
FIG. 8 is a diagrammatic view illustrating a spherical aberration, an astigmatism, a distortional aberration and lateral aberrations in a wide angle end state of the variable focal length lens system of FIG. 7 together with FIGS. 9 to 11 according to a numerical value example wherein particular numerical values are applied to the variable focal length lens system.
Figure 9:
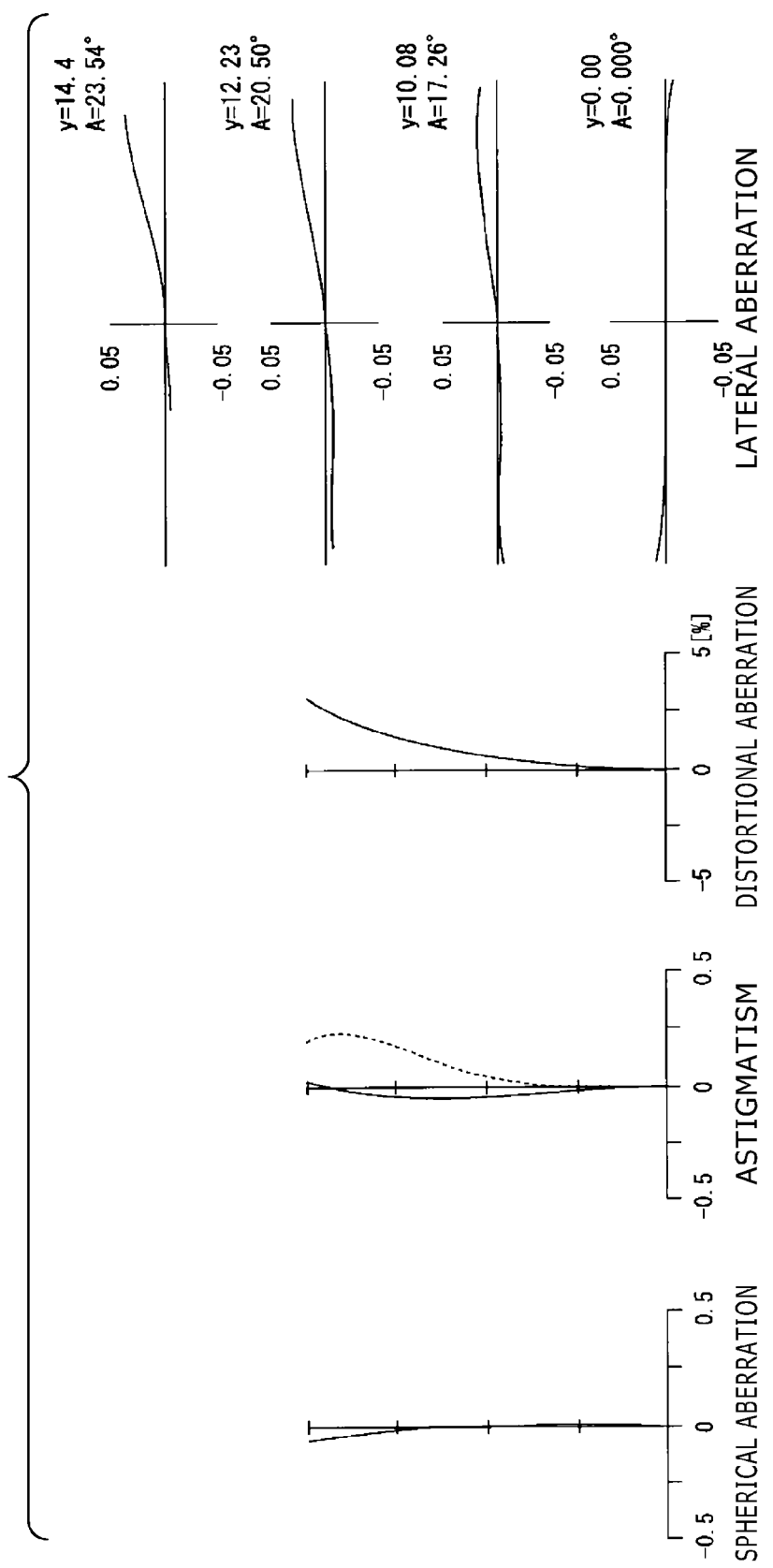
FIG. 9 is a similar view but illustrating a spherical aberration, an astigmatism, a distortional aberration and lateral aberrations in a first intermediate focal length state of the variable focal length lens system of FIG. 7.
Figure 10:
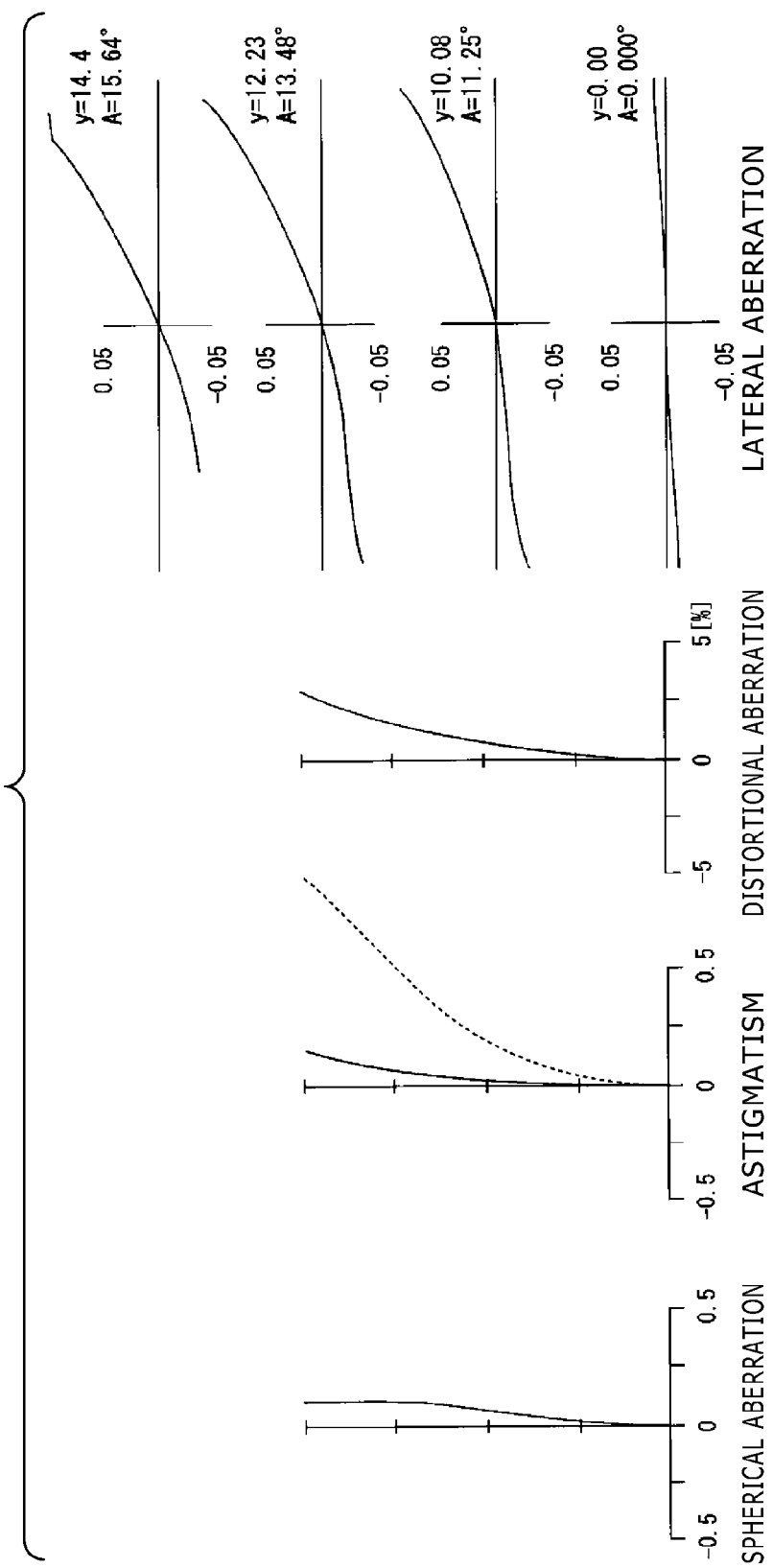
FIG. 10 is a similar view but illustrating a spherical aberration, an astigmatism, a distortional aberration and lateral aberrations in a second intermediate focal length state of the variable focal length lens system of FIG. 7.
Figure 11:
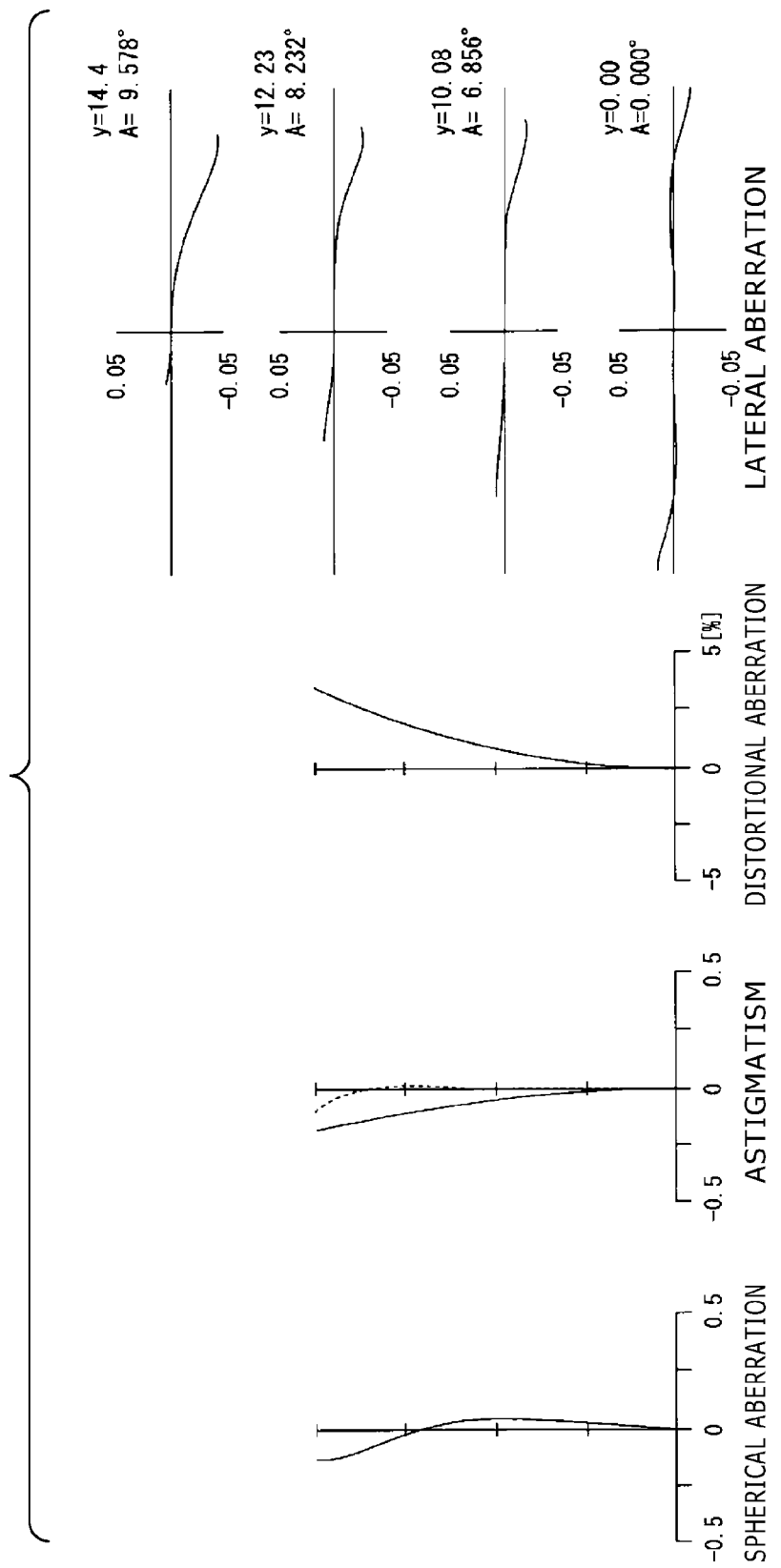
FIG. 11 is a similar view but illustrating a spherical aberration, an astigmatism, a distortional aberration and lateral aberrations in a telephoto end state of the variable focal length lens system of FIG. 7.

Various aberrations in the numerical value example 2 are illustrated in FIGS. 8 to 11. FIG. 8 illustrates the aberrations in an infinitely remotely focused state in the wide angle end state, FIG. 9 the aberrations in an infinitely remotely focused state in a first intermediate focus position state, FIG. 10 the aberrations in an infinitely remotely focused state in a second intermediate focus position state, and FIG. 11 the aberrations in an infinitely remotely focused state in the telephoto end state.

In FIGS. 8 to 11, in the spherical aberration diagrams, the axis of ordinate indicates the ratio of the spherical aberration to the open F value and the axis of abscissa indicates the defocus amount. Further, a curve indicates values on the d line (wavelength: 587.56 nm). In the astigmatism diagrams, the axis of ordinate indicates the angle of view and the axis of abscissa indicates the defocus amount. Further, a solid line curve indicates values on the sagittal image plane of the d line; and a broken line curve indicates values on the meridional image plane of the d line. In the distortional aberration diagrams, the axis of ordinate indicates the angle of view and the axis of abscissa indicates %, and a curve indicates values on the d line.

From the aberration diagrams, it is apparent that, in the numerical value example 2, the aberrations are corrected favorably and a superior image formation performance is exhibited.

<Third Embodiment>

Figure 12:
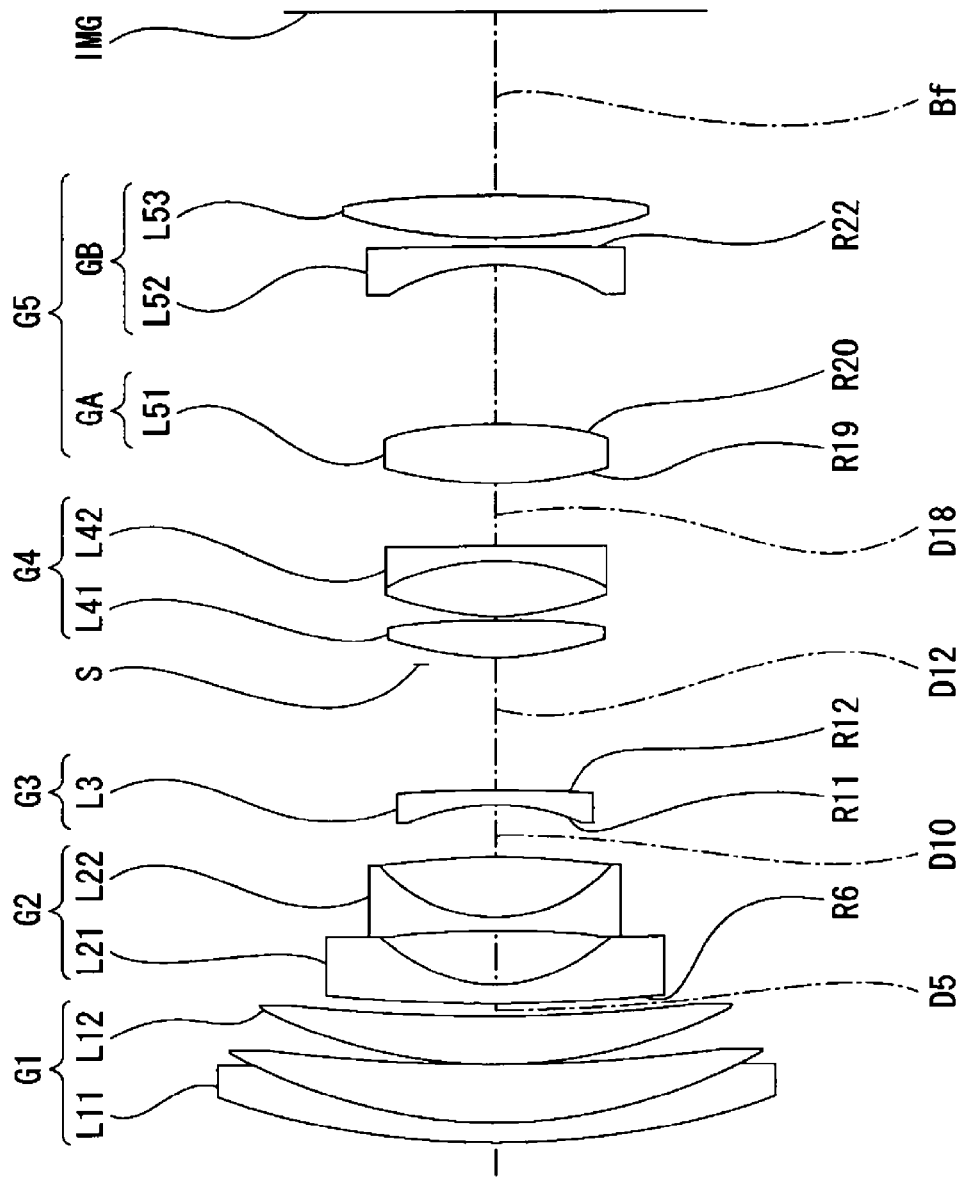
FIG. 12 is a schematic view showing a lens configuration of a variable focal length lens system according to a third embodiment of the present technology.

FIG. 12 shows a lens configuration of a variable focal length lens system 3 according to a third embodiment of the present technology.

The variable focal length lens system 3 has a zoom ratio of 4.71 times.

The first lens group G1 includes a cemented lens L11 of a negative lens of a meniscus shape having a convex face directed to the object side and a positive lens of a meniscus shape having a convex face directed to the object side, and a positive lens L12 of a meniscus shape having a convex face directed to the object side. The cemented lens L11 and the positive lens L12 are located in order from the object side to the image side.

The second lens group G2 includes a negative lens L21 of a meniscus shape having a convex face directed to the object side, and a cemented lens L22 of a negative lens of a biconcave shape and a positive lens of a biconvex shape. The negative lens L21 and the cemented Jens L22 are located in order from the object side to the image side.

The third lens group G3 is configured from a negative lens L3 of a meniscus shape having a concave face directed to the object side.

The fourth lens group G4 is configured from a positive lens L41 of a biconvex shape and a cemented lens L42 of a biconvex lens and a biconcave lens. The positive lens L41 and the cemented lens L42 are located in order from the object side to the image side.

The fifth lens group G5 is configured from a positive lens L51 of a biconvex shape, a negative lens L52 of a meniscus shape having a concave face directed to the object side, and a positive lens L53 of a biconvex shape. The positive lens L51, negative lens L52 and positive lens L53 are located in order from the object side to the image side.

The fifth lens group G5 is configured from a first sub lens group GA having a positive refracting power and a second sub lens group GB having a negative refracting power. The first sub lens group GA and the second sub lens group GB are located in order from the object side to the image side. The first sub lens group GA is configured from the positive lens L51, and the second sub lens group GB is configured from the negative lens L52 and the positive lens L53.

Between the negative lens L3 of the third lens group G3 and the positive lens L41 of the fourth lens group G4, an aperture stop S is located in the proximity of the positive lens L41. The aperture stop S is moved integrally with the fourth lens group G4 when the positional state of the variable focal length lens system 3 changes.

A low-pass filter not shown is located between the fifth lens group G5 and an image plane IMG.

Table 7 indicates lens data of a numerical value example 3 wherein particular numerical values are applied to the variable focal length lens system 3 of the third embodiment.

TABLE 7

| Face number | Radius of curvature | Face distance | Refractive index | Abbe number |
|---|---|---|---|---|
| 1 | 65.1751 | 1.50 | 1.92286 | 20.80 |
| 2 | 39.6052 | 4.30 | 1.59282 | 68.63 |
| 3 | 148.5737 | 0.10 | | |
| 4 | 39.8939 | 3.53 | 1.75500 | 52.30 |
| 5 | 186.7055 | (D5) | | |
| 6(ASP) | 180.8799 | 1.40 | 1.83500 | 42.98 |
| 7 | 12.0537 | 3.90 | | |
| 8 | −75.2166 | 0.90 | 1.74400 | 44.90 |
| 9 | 11.1436 | 4.39 | 1.84666 | 23.83 |
| 10 | −85.9367 | (D10) | | |
| 11(ASP) | −16.6399 | 1.00 | 1.69680 | 55.34 |
| 12(ASP) | −307.5967 | (D12) | | |
| 13(Aperture stop) | 0.0000 | 0.40 | | |
| 14 | 21.6674 | 2.81 | 1.59282 | 68.63 |
| 15 | −69.3203 | 0.20 | | |
| 16 | 20.4772 | 4.09 | 1.49700 | 81.60 |
| 17 | −17.9962 | 0.90 | 1.90366 | 31.13 |
| 18 | 288.7338 | (D18) | | |
| 19(ASP) | 24.5784 | 4.50 | 1.58913 | 61.25 |
| 20(ASP) | −30.7632 | 11.43 | | |
| 21 | −15.4743 | 1.40 | 1.91082 | 35.25 |
| 22(ASP) | −87.6111 | 0.74 | | |
| 23 | 42.1256 | 3.07 | 1.75520 | 27.53 |
| 24 | −80.1625 | (Bf) | | |

In the variable focal length lens system 3, the face of the negative lens L21 of the second lens group G2 on the object side, namely, the sixth face, the opposite faces of the negative lens L3 of the third lens group G3, namely, the 11th and 12th faces, the opposite faces of the positive lens L51 of the fifth lens group G5, namely, the 19th and 20th faces, and the face of the negative lens L52 of the fifth lens group G5 on the image side, namely, the 22nd face, are formed as aspheric faces.

The fourth-, sixth-, eighth- and tenth-order aspheric coefficients A4, A6, A8 and A10 of the aspheric faces in the numerical value example 3 are indicated in Table 8 together with the conic constant K.

TABLE 8

| Face number | κ | A4 | A6 | A8 | A10 |
|---|---|---|---|---|---|
| 6 | −9.9899 | 0.110875E−04 | −0.335002E−07 | 0.261072E−09 | −0.862937E−12 |
| 11 | 0.0000 | 0.171701E−04 | −0.998619E−07 | 0.115765E−08 | −0.201604E−10 |
| 12 | 0.0000 | −0.247653E−04 | 0.000000E+00 | 0.000000E+00 | 0.000000E+00 |
| 19 | 0.0000 | −0.578709E−04 | −0.141171E−06 | −0.976182E−09 | 0.225109E−11 |
| 20 | 0.0000 | −0.106172E−04 | −0.224476E−06 | 0.000000E+00 | 0.000000E+00 |
| 22 | 0.0000 | 0.615026E−04 | 0.144947E−06 | −0.111960E−08 | 0.223987E−11 |

Upon zooming between the wide angle end state and the telephoto end state of the variable focal length lens system 3, the face distance D5 between the first lens group G1 and the second lens group G2, the face distance D10 between the second lens group G2 and the third lens group G3, the face distance D12 between the third lens group G3 and the fourth lens group G4, the face distance D18 between the fourth lens group G4 and the fifth lens group G5 and the back focus Bf change.

The variations of the face distances in the numerical value example 3 in the wide angle end state, a first intermediate focus position state, a second intermediate focus position state and the telephoto end state are indicated in Table 9 together with the focal length f, angle 2ω of view and F number Fno.

TABLE 9

| | Wide angle end | First intermediate focal length | Second intermediate focal length | Telephoto end |
|---|---|---|---|---|
| f | 16.4799 | 30.7574 | 48.7428 | 77.5993 |
| 2ω | 42.5567 | 24.4752 | 15.9867 | 10.1647 |
| Fno | 3.6010 | 3.9999 | 4.4010 | 4.7555 |
| D5 | 0.8000 | 8.8619 | 14.2145 | 21.8452 |
| D10 | 3.9385 | 3.8012 | 3.4444 | 3.9385 |
| D12 | 9.2628 | 4.7783 | 2.4804 | 0.6000 |
| D18 | 4.7466 | 2.8394 | 2.1121 | 1.5000 |
| Bf | 13.2999 | 23.6412 | 33.5616 | 40.5564 |

Figure 13:
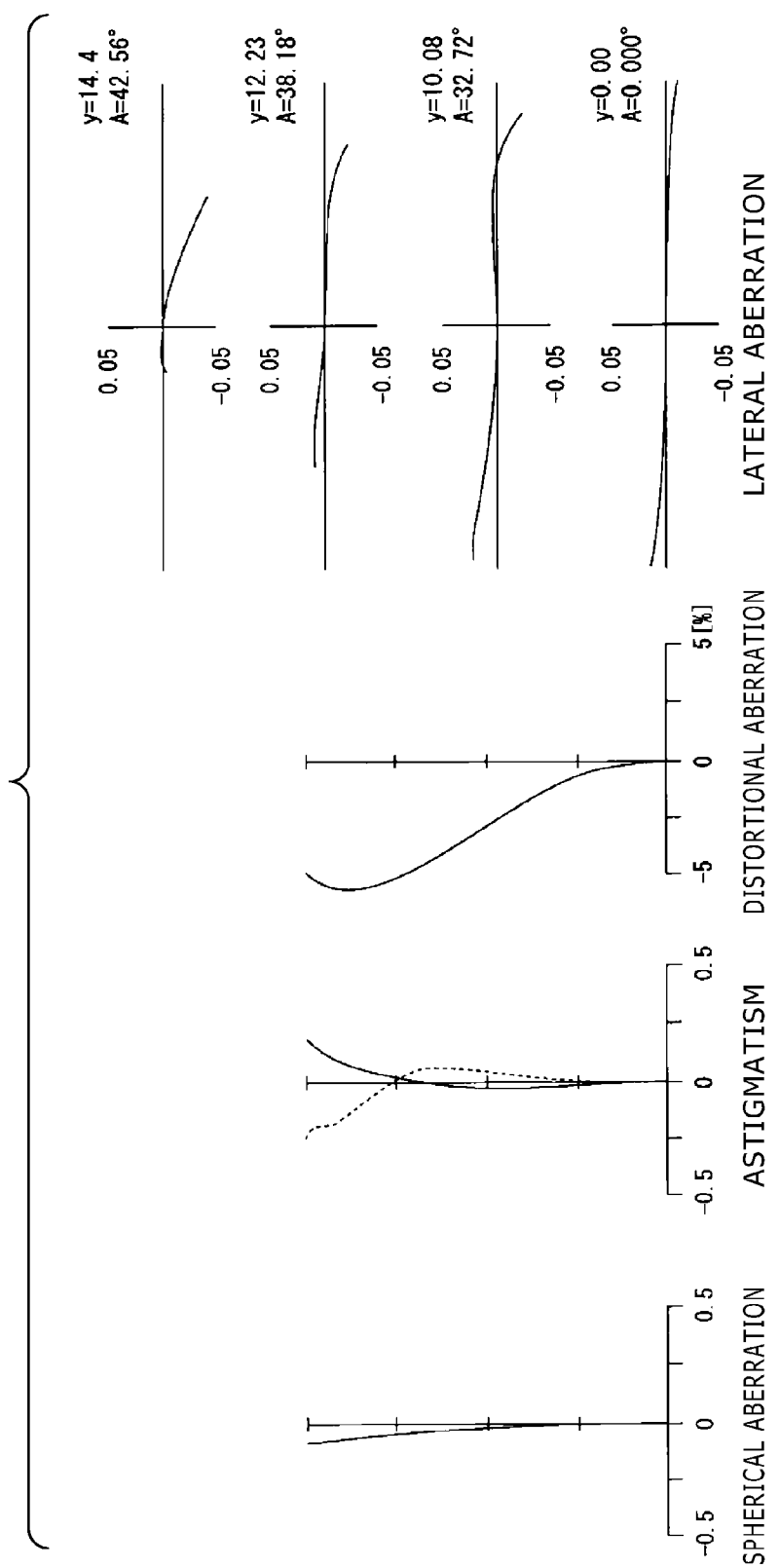
FIG. 13 is a diagrammatic view illustrating a spherical aberration, an astigmatism, a distortional aberration and lateral aberrations in a wide angle end state of the variable focal length lens system of FIG. 12 together with FIGS. 14 to 16 according to a numerical value example wherein particular numerical values are applied to the variable focal length lens system.
Figure 14:
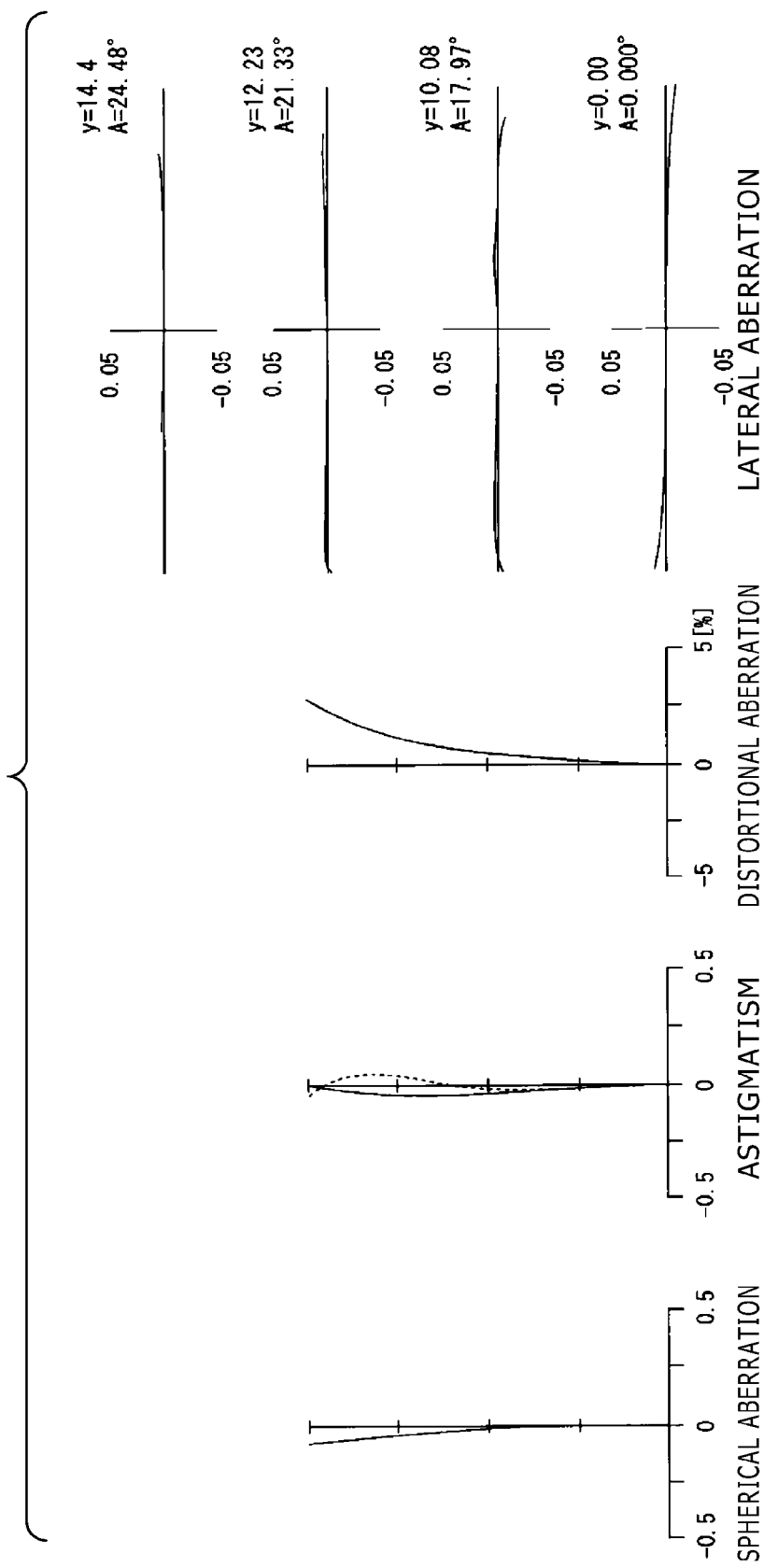
FIG. 14 is a similar view but illustrating a spherical aberration, an astigmatism, a distortional aberration and lateral aberrations in a first intermediate focal length state of the variable focal length lens system of FIG. 12.
Figure 15:
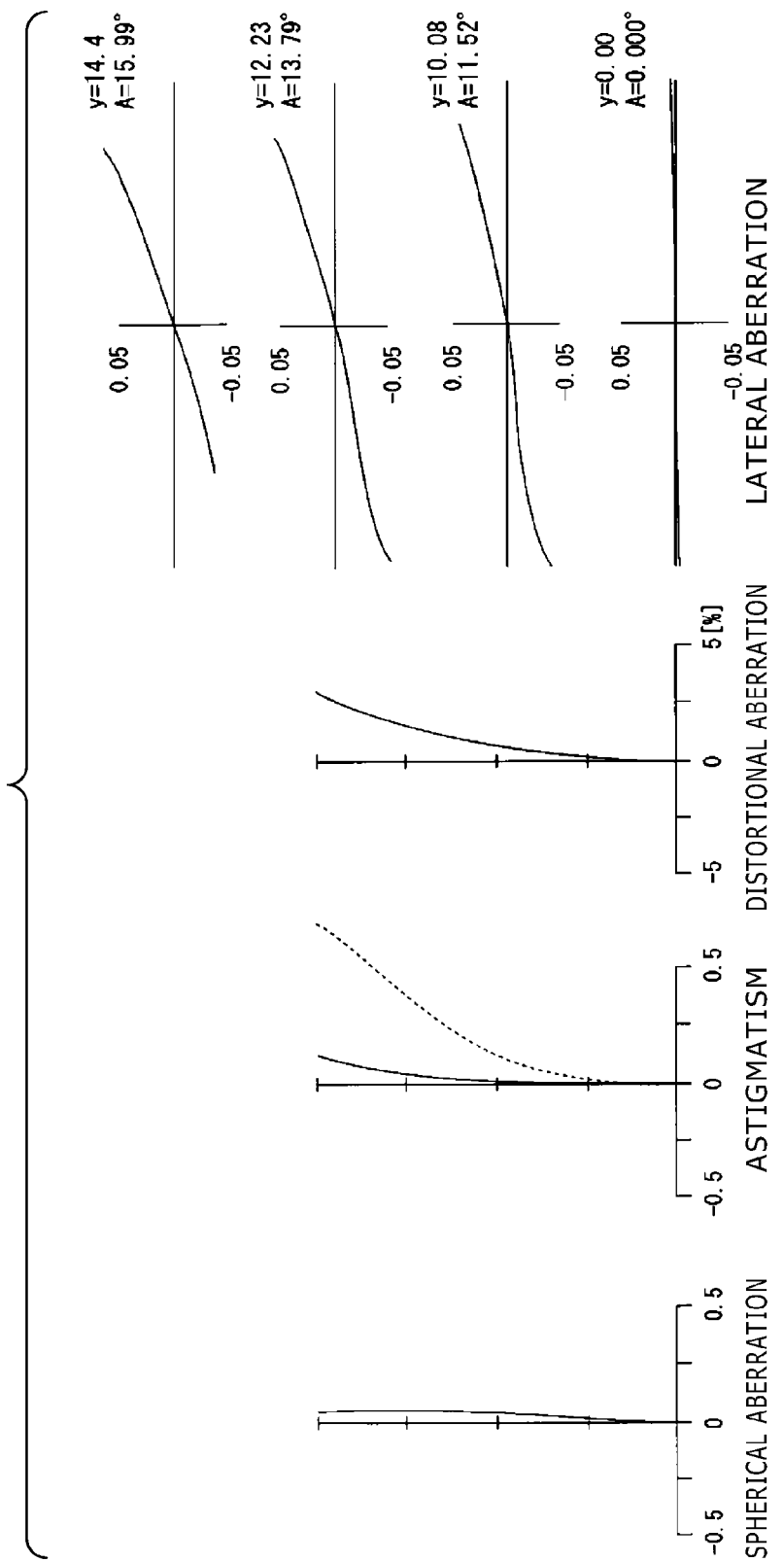
FIG. 15 is a similar view but illustrating a spherical aberration, an astigmatism, a distortional aberration and lateral aberrations in a second intermediate focal length state of the variable focal length lens system of FIG. 12.
Figure 16:
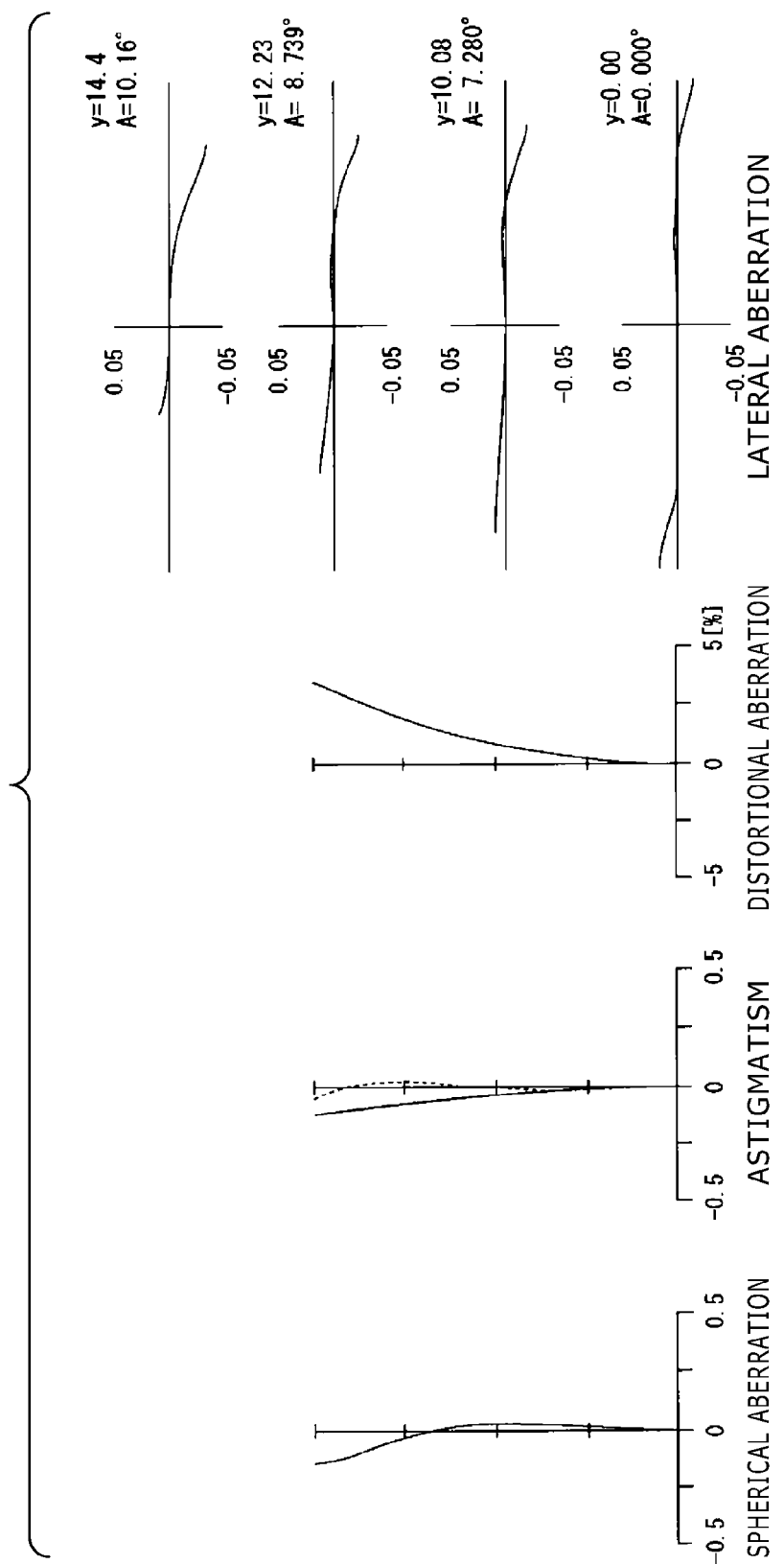
FIG. 16 is a similar view but illustrating a spherical aberration, an astigmatism, a distortional aberration and lateral aberrations in a telephoto end state of the variable focal length lens system of FIG. 12.

Various aberrations in the numerical value example 3 are illustrated in FIGS. 13 to 16. FIG. 13 illustrates the aberrations in an infinitely remotely focused state in the wide angle end state, FIG. 14 the aberrations in an infinitely remotely focused state in a first intermediate focus position state, FIG. 15 the aberrations in an infinitely remotely focused state in a second intermediate focus position state, and FIG. 16 the aberrations in an infinitely remotely focused state in the telephoto end state.

In FIGS. 13 to 16, in the spherical aberration diagrams, the axis of ordinate indicates the ratio of the spherical aberration to the open F value and the axis of abscissa indicates the defocus amount. Further, a curve indicates values on the d line (wavelength: 587.56 nm). In the astigmatism diagrams, the axis of ordinate indicates the angle of view and the axis of abscissa indicates the defocus amount. Further, a solid line curve indicates values on the sagittal image plane of the d line; and a broken line curve indicates values on the meridional image plane of the d line. In the distortional aberration diagrams, the axis of ordinate indicates the angle of view and the axis of abscissa indicates %, and a curve indicates values on the d line.

From the aberration diagrams, it is apparent that, in the numerical value example 3, the aberrations are corrected favorably and a superior image formation performance is exhibited.

[Values of the Conditional Expressions of the Variable Focal Length Lens System]

In the following, values of the conditional expressions of the variable focal length lens system of the embodiment of the present technology are described.

Values of the conditional expressions (1) to (6) in the variable focal length lens systems 1 to 3 of the first to third embodiments are indicated in Table 10.

TABLE 10

|  |  | Embodiment 1 | Embodiment 2 | Embodiment 3 |
|---|---|---|---|---|
|  | Dsub | 11.04 | 11.87 | 11.43 |
|  | fw | 16.4800 | 16.4800 | 16.4799 |
| Conditional expression(1) | 0.5 < Dsub/fw < 0.9 | 0.670 | 0.721 | 0.693 |
|  | f5A | 23.1570 | 23.3258 | 23.912 |
| Conditional expression(2) | 1.2 < f5A/fw < 1.6 | 1.405 | 1.415 | 1.451 |
| Conditional expression(3) | β5w | −0.026 | −0.107 | −0.031 |
|  | DsB | 0.18 | 1.10 | 0.74 |
| Conditional expression(4) | DsB/fw < 0.15 | 0.011 | 0.067 | 0.045 |
|  | f12w | −32.6526 | −30.3745 | −32.973 |
| Conditional expression(5) | −0.70 < fw/f12w < −0.35 | −0.505 | −0.542 | −0.500 |
|  | Rt | −77.8738 | −117.8113 | −75.2166 |
| Conditional expression(6) | −0.30 < fw/Rt < −0.05 | −0.212 | −0.140 | −0.219 |

As apparent from Table 10, the variable focal length lens systems 1 to 3 of the first to third embodiments are configured so as to satisfy the conditional expressions (1) to (6).

[Configuration of the Image Pickup Apparatus]

The image pickup apparatus of the embodiment of the present technology includes a variable focal length lens system which in turn includes a first lens group having a positive refracting power, a second lens group having a negative refracting power, a third lens group having a negative refracting power, a fourth lens group having a positive refracting power, and a fifth lens group having a positive refracting power, disposed in order from the object side to the image side.

Further, in the variable focal length lens system of the image pickup apparatus of the embodiment of the present technology, all of the first to fifth lens groups move, when a positional state of the zoom lens changes from a wide angle end state to a telephoto end state, such that an air gap between the first and second lens groups increases; an air gap between the second and third lens groups changes; an air gap between the third and fourth lens groups decreases; and an air gap between the fourth and fifth lens groups decreases.

First, functions of the lens groups which configure the variable focal length lens system of the image pickup apparatus of the embodiment of the present technology are described.

In the variable focal length lens system of the image pickup apparatus of the embodiment of the present technology, the first and second lens groups are disposed closely to each other in the wide angle end state. Therefore, an off-axis ray incident to the first lens group approaches the optical axis. As a result, the lens diameter can be reduced. Simultaneously, when the positional state of the zoom lens changes from the wide angle end state to the telephoto end state, since the air gap between the first and second lens groups increases, the off-axis ray passing the first lens group is directed away from the optical axis. In the embodiment of the present technology, this variation of the height of the off-axis ray is utilized to favorably correct the variation of the off-axis aberration caused by the variation of the positional state of the zoom lens.

Since the second and third lens groups have negative refracting powers, the two lens groups are located closely to each other in the wide angle end state so that off-axis ray incident to the first lens group is directed toward the optical axis. When the positional state of the zoom lens changes from the wide angle end state to the telephoto end state, the air gap between the second and third lens groups is changed to change the combined refracting power of the two lens groups thereby to effectively change the combined refracting power of the first to third lens groups.

To the fourth lens group, the ray diverged by the third lens group is incident. Therefore, the fourth lens group takes charge of correction principally of an on-axis aberration which is liable to occur with the incident ray.

Further, in the variable focal length lens system of the image pickup apparatus of the embodiment of the present technology, the fifth lens group is configured from a first sub lens group having a positive refracting power and a second sub lens group disposed on the image side with respect to the first sub lens group with an air gap left therebetween and having a negative refracting power.

The fifth lens group takes charge of a role of causing a ray to form an image. In the embodiment of the present technology, in order to reduce the overall length of the variable focal length lens system, the fifth lens group is configured from the first sub lens group disposed on the object side and having a positive refracting power, and the second sub lens group disposed on the image side and having a negative refracting power.

In the variable focal length lens system of the image pickup apparatus of the embodiment of the present technology having such a configuration as described above, attention is paid to a condition given below to achieve reduction of the overall length of the variable focal length lens system while a high zoom ratio is achieved.

This condition is "to appropriately set the air gap between the first and second sub lens groups."

In the embodiment of the present technology, in the wide angle end state, the air gap between the third and fourth lens groups is in an increased state. Accordingly, on the object side, the positive lens group, namely, the first lens group, and the two negative lens groups, namely, the second and third lens groups, are located. However, on the image side, the two positive lens groups, namely, the fourth and fifth lens groups, are located, and therefore, no negative lens group exists. Therefore, it is difficult to favorably correct a negative distortion aberration in the wide angle end state.

Therefore, the fifth lens group is configured from the first sub lens group having a positive refracting power and the second sub lens group disposed on the image side with respect to the first sub lens group and having a negative refracting power. By the configuration, a negative distortion aberration which is liable to appear in the wide angle end state is corrected favorably.

Further, since the first and second sub lens groups are located with an increased air gap, an off-axis ray which passes the second sub lens group passes away from the optical axis. As a result, a variation of a comatic aberration caused by a variation of the angle of view in the wide angle end state can be corrected favorably.

From the foregoing, the condition "to appropriately set the air gap between the first and second sub lens groups." is significant.

In the image pickup apparatus of the embodiment of the present technology, the variable focal length lens system satisfies the following expression (1):

$$0.5 < D\mathrm{sub}/fw < 0.9 \qquad (1)$$

where Dsub is the air gap between the first and second sub lens groups on an optical axis, and fw is the focal length of the entire variable focal length lens system in the wide angle end state.

The conditional expression (1) defines the air gap between the first and second sub lens groups of the fifth lens group and defines numerical limitations of the condition described above.

If the air gap between the first and second sub lens groups of the fifth lens group becomes equal to or greater than the upper limit value of the conditional expression (1), then it becomes difficult to reduce the overall length of the variable focal length lens system while a predetermined back focus is assured.

On the contrary, if the air gap between the first and second sub lens groups of the fifth lens group becomes equal to or smaller than the lower limit value of the conditional expression (1), then performance degradation by mutual eccentricity of the first and second sub lens groups becomes excessively great. Consequently, it becomes difficult to assure stabilized mass production performances.

Thus, in the image pickup apparatus, where the variable focal length lens system satisfies the conditional expression (1), the overall length of the variable focal length lens system can be reduced while a predetermined back focus is assured. Further, by reduction of the mutual eccentricity of the first and second sub lens groups, stabilized mass production performances can be assured.

According to the embodiment of the present technology, an image pickup apparatus including a variable focal length lens system very suitable for a lens system wherein the angle of view in the wide angle end state is 70 to 80 degrees, the zoom ratio is approximately five times and the F number in the wide angle end state is approximately F2.8 to F4.0 can be configured.

[Form of the Image Pickup Apparatus]

Figure 17:
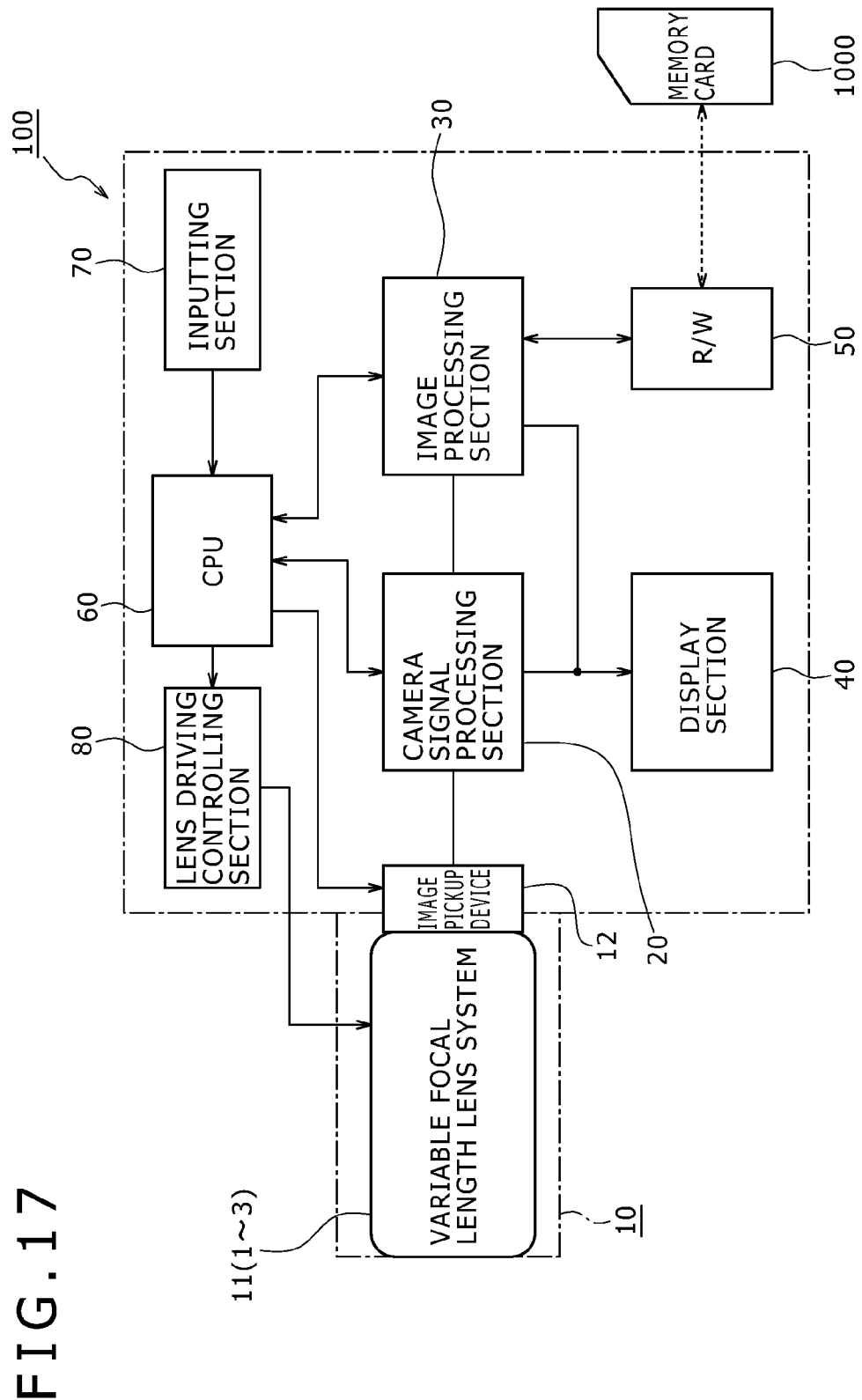
FIG. 17 is a block diagram showing an example of the image pickup apparatus.

FIG. 17 shows a block diagram of a digital camera of the interchangeable lens type which is a form of the image pickup apparatus of the embodiment of the present technology.

Referring to FIG. 17, the image pickup apparatus 100 in the form of a digital camera includes a camera block 10 which takes charge of an image pickup function, and a camera signal processing section 20 for carrying out signal processing of an image signal picked up by the camera block 10 such as analog to digital conversion. The image pickup apparatus 100 further includes an image processing section 30 for carrying out a recording and reproduction process of the image signal. The image pickup apparatus 100 further includes a display section 40 such as an LCD (Liquid Crystal Display) unit for displaying a picked up image and so forth thereon, and a reader/writer (R/W) 50 for carrying out writing and reading out of an image signal into and from a memory card 1000. The image pickup apparatus 100 further includes a CPU (Central Processing Unit) 60 for controlling the entire image pickup apparatus, an inputting section 70 including various switches and so forth for being operated by a user, and a lens driving controlling section 80 for controlling driving of the lens disposed in the camera block 10.

The camera block 10 is, for example, included in an interchangeable lens. The camera block 10 is configured from an optical system including a variable focal length lens system 11, which may be any of the variable focal length lens systems 1, 2 and 3 to which the present technology is applied, an image pickup device 12 such as a CCD (Charge Coupled Device) unit or a CMOS (Complementary Metal-Oxide Semiconductor) unit, and so forth.

The camera signal processing section 20 carries out various signal processes for an output signal of the image pickup device 12 such as conversion into a digital signal, noise removal, picture quality correction and conversion into luminance and color difference signals.

The image processing section 30 carries out compression coding and decompression decoding processes of an image signal based on a predetermined image data format, a conversion process of data specifications of a resolution and so forth, and other processes.

The display section 40 has a function of displaying thereon an operation state of the inputting section 70 by the user and various data such as a picked up image.

The reader/writer 50 carries out writing of image data encoded by the image processing section 30 into the memory card 1000 and reading out of image data recorded in the memory card 1000.

The CPU 60 functions as a controlling processing section for controlling the circuit blocks provided in the image pickup apparatus 100 and controls the circuit blocks based on an instruction input signal from the inputting section 70 and so forth.

The inputting section 70 is configured, for example, from a shutter release button for carrying out a shutter operation, a selection switch for selecting an operation mode and other elements. The inputting section 70 outputs an instruction input signal corresponding to an operation by the user to the CPU 60.

The lens driving controlling section 80 controls a motor and other members not shown for driving the lenses of the variable focal length lens system 11 based on a control signal from the CPU 60.

The memory card 1000 is a semiconductor memory which is removably inserted, for example, into a slot connected to the reader/writer 50.

In the following, operation of the image pickup apparatus 100 is described.

In a standby state for image pickup, an image signal picked up by the camera block 10 is outputted to the display section 40 through the camera signal processing section 20 under the control of the CPU 60 and displayed as a camera-through image on the display section 40. On the other hand, if an instruction input signal for zooming is inputted from the inputting section 70, then the CPU 60 outputs a control signal to the lens driving controlling section 80 so that predetermined lenses of the variable focal length lens system 11 are moved under the control of the lens driving controlling section 80.

If the shutter not shown of the camera block 10 is operated in response to the instruction input signal from the inputting section 70, then a picked up image signal is outputted from the camera signal processing section 20 to the image processing section 30 and subjected to a compression coding process by the image processing section 30. By the compression coding process, the image signal is converted into digital data of a predetermined data format. The resulting data is outputted to the reader/writer 50 and written into the memory card 1000.

Focusing is carried out by the lens driving controlling section 80 moving the predetermined lenses of the variable focal length lens system 11 based on a control signal from the CPU 60, for example, when the shutter release button of the inputting section 70 is half-depressed or is fully depressed for recording or image pickup.

In order to reproduce image data recorded in the memory card 1000, predetermined image data is read out from the memory card 1000 in response to an operation for the inputting section 70 by the reader/writer 50, and a decompression decoding process is carried out for the image data by the image processing section 30. Then, a reproduction image signal is outputted from the image processing section 30 to the display section 40 so that a reproduction image is displayed on the display section 40.

It is to be noted that, while the embodiment described above is directed to an example wherein the image pickup apparatus is applied to a digital camera of the interchangeable lens type, the application range of the image pickup apparatus is not limited to the digital camera of the interchangeable lens type. In particular, the image pickup apparatus can be applied widely as a camera section or the like of a digital inputting and outputting apparatus such as a digital still camera, a digital video camera, a portable telephone set in which a camera is incorporated, a PDA (Personal Digital Assistant) in which a camera is incorporated and like apparatus.

[Others]

In the variable focal length lens system and the image pickup apparatus of the embodiments of the present technology, a lens which has substantially no refracting power or some other optical element such as an aperture stop may be disposed in addition to the first to fifth lens groups. In this instance, the variable focal length lens system of the embodiments of the present, technology has a substantially five-lens configuration including the first to fifth lens groups.

[Present Technology]

Also it is possible to configure the present technology in the following manner.

<1> A variable focal length lens system, including a first lens group having a positive refracting power, a second lens group having a negative refracting power, a third lens group having a negative refracting power, a fourth lens group having a positive refracting power, and a fifth lens group having a positive refracting power, the first, second, third, fourth and fifth lens groups being disposed in order from the object side to the image side, all of the first to fifth lens groups moving, when a positional state of the variable focal length lens system changes from a wide angle end state to a telephoto end state, such that an air gap between the first and second lens groups increases, an air gap between the second and third lens groups changes, an air gap between the third and fourth lens groups decreases, and an air gap between the fourth and fifth lens groups decreases, the fifth lens group being configured from a first sub lens group having a positive refracting power and a second sub lens group disposed on the image side with respect to the first sub lens group with an air gap left therebetween and having a negative refracting power, and the variable focal length lens system satisfying the following expression (1):

$$0.5 < D\text{sub}/fw < 0.9 \quad (1)$$

where Dsub is the air gap between the first and second sub lens groups on an optical axis, and fw is a focal length of the entire lens system in the wide angle end state.

<2> The variable focal length lens system according to <1> above, wherein the variable focal length lens system further satisfies the following expression (2):

$$1.2 < f5A/fw < 1.6 \quad (2)$$

where f5A is a focal length of the first sub lens group.

<3> The variable focal length lens system according to <1> or <2> above, wherein the variable focal length lens system further satisfies the following expression (3):

$$-0.2 < \beta 5w < 0.1 \quad (3)$$

where β5w is a lateral magnification of the fifth lens group.

<4> The variable focal length lens system according to any one of <1> to <3> above, wherein the second sub lens group is configured from two lenses including a negative lens and a positive lens disposed in order from the object side to the image side; and the variable focal length lens system further satisfies the following expression (4):

$$DsB/fw < 0.15 \quad (4)$$

where DsB is an air gap between the negative lens and the positive lens of the second sub lens group on an optical axis.

<5> The variable focal length lens system according to any one of <1> to <4> above, wherein an aperture stop is disposed between the third and fourth lens groups.

<6> The variable focal length lens system according to any one of <1> to <5> above, wherein the third lens group moves upon short-distance focusing, and the third lens group is configured from a single lens; and the variable focal length lens system further satisfies the following expression (5):

$$-0.70 < fw/f12w < -0.35 \quad (5)$$

where f12w is a combined focal length of the first and second lens groups in the wide angle end state.

<7> The variable focal length lens system according to any one of <1> to <6> above, wherein the second lens group is configured from a negative lens having a concave face directed to the image side and a cemented lens including a negative lens and a positive lens cemented to each other, the negative lens and the cemented lens being disposed in order from the object side to the image side; and the variable focal length lens system further satisfies the following expression (6):

$$-0.30 < fw/Rt < -0.05 \quad (6)$$

where Rt is a radius of curvature of the most object side face of the cemented lens of the second lens group.

<8> An image pickup apparatus, including a variable focal length lens system, and an image pickup device configured to convert an optical image formed by the variable focal length lens system into an electric signal, the variable focal length lens system including a first lens group having a positive refracting power, a second lens group having a negative refracting power, a third lens group having a negative refracting power, a fourth lens group having a positive refracting power, and a fifth lens group having a positive refracting power, the first, second, third, fourth and fifth lens groups being disposed in order from the object side to the image side, all of the first to fifth lens groups moving, when a positional state of the variable focal length lens system changes from a wide angle end state to a telephoto end state, such that an air gap between the first and second lens groups increases, an air gap between the second and third lens groups changes, an air gap between the third and fourth lens groups decreases, and an air gap between the fourth and fifth lens groups decreases, the fifth lens group being configured from a first sub lens group having a positive refracting power and a second sub lens group disposed on the image side with respect to the first sub lens group with an air gap left therebetween and having a negative refracting power, and the variable focal length lens system satisfying the following expression (1):

$$0.5 < D\text{sub}/fw < 0.9 \quad (1)$$

where Dsub is the air gap between the first and second sub lens groups on an optical axis, and fw is a focal length of the entire lens system in the wide angle end state.

<9> The variable focal length lens system according to any one of <1> to <7> above or the image pickup apparatus according to <8> above, wherein an optical element including a lens having substantially no lens refracting power is further located.

The shapes and the numerical values of the components specified in the embodiments described hereinabove are mere examples of embodiments in carrying out the present technology, and the technical scope of the present technology shall not be interpreted restrictively by them.

The present technology contains subject matter related to that disclosed in Japanese Priority Patent Application JP 2012-056251 filed in the Japan Patent Office on Mar. 13, 2012, the entire content of which is hereby incorporated by reference.

What is claimed is:

1. A variable focal length lens system, comprising:
    a first lens group having a positive refracting power;
    a second lens group having a negative refracting power;
    a third lens group having a negative refracting power;
    a fourth lens group having a positive refracting power; and
    a fifth lens group having a positive refracting power;
    the first, second, third, fourth and fifth lens groups being disposed in order from the object side to the image side;
    all of the first to fifth lens groups moving, when a positional state of the variable focal length lens system changes from a wide angle end state to a telephoto end state, such that an air gap between the first and second lens groups increases, an air gap between the second and third lens groups changes, an air gap between the third and fourth lens groups decreases, and an air gap between the fourth and fifth lens groups decreases;
    the fifth lens group being configured from a first sub lens group having a positive refracting power and a second sub lens group disposed on the image side with respect to the first sub lens group with an air gap left therebetween and having a negative refracting power; and
    the variable focal length lens system satisfying the following expression (1):

$$0.5 < Dsub/fw < 0.9 \qquad (1)$$

where Dsub is the air gap between the first and second sub lens groups on an optical axis, and fw is a focal length of the entire lens system in the wide angle end state,
    wherein the variable focal length lens system further satisfies the following expression (2):

$$1.2 < f5A/fw < 1.6 \qquad (2)$$

where f5A is a focal length of the first sub lens group.

2. The variable focal length lens system according to claim 1, wherein
    the variable focal length lens system further satisfies the following expression (3):

$$-0.2 < \beta 5w < 0.1 \qquad (3)$$

where β5w is a lateral magnification of the fifth lens group.

3. The variable focal length lens system according to claim 1, wherein
    the second sub lens group is configured from two lenses including a negative lens and a positive lens disposed in order from the object side to the image side; and
    the variable focal length lens system further satisfies the following expression (4):

$$DsB/fw < 0.15 \qquad (4)$$

where DsB is an air gap between the negative lens and the positive lens of the second sub lens group on an optical axis.

4. The variable focal length lens system according to claim 1, wherein
    an aperture stop is disposed between the third and fourth lens groups.

5. The variable focal length lens system according to claim 1, wherein
    the third lens group moves upon short-distance focusing, and the third lens group is configured from a single lens; and
    the variable focal length lens system further satisfies the following expression (5):

$$-0.70 < fw/f12w < -0.35 \qquad (5)$$

where f12w is a combined focal length of the first and second lens groups in the wide angle end state.

6. The variable focal length lens system according to claim 1, wherein
    the second lens group is configured from a negative lens having a concave face directed to the image side and a cemented lens including a negative lens and a positive lens cemented to each other, the negative lens and the cemented lens being disposed in order from the object side to the image side; and
    the variable focal length lens system further satisfies the following expression (6):

$$-0.30 < fw/Rt < -0.05 \qquad (6)$$

where Rt is a radius of curvature of the most object side face of the cemented lens of the second lens group.

7. An image pickup apparatus, comprising:
    a variable focal length lens system; and
    an image pickup device configured to convert an optical image formed by the variable focal length lens system into an electric signal;
    the variable focal length lens system including a first lens group having a positive refracting power, a second lens group having a negative refracting power, a third lens group having a negative refracting power, a fourth lens group having a positive refracting power, and a fifth lens group having a positive refracting power, the first, second, third, fourth and fifth lens groups being disposed in order from the object side to the image side;
    all of the first to fifth lens groups moving, when a positional state of the variable focal length lens system changes from a wide angle end state to a telephoto end state, such that an air gap between the first and second lens groups increases, an air gap between the second and third lens groups changes, an air gap between the third and fourth lens groups decreases, and an air gap between the fourth and fifth lens groups decreases;
    the fifth lens group being configured from a first sub lens group having a positive refracting power and a second sub lens group disposed on the image side with respect to the first sub lens group with an air gap left therebetween and having a negative refracting power; and
    the variable focal length lens system satisfying the following expression (1):

$$0.5 < Dsub/fw < 0.9 \qquad (1)$$

where Dsub is the air gap between the first and second sub lens groups on an optical axis, and fw is a focal length of the entire lens system in the wide angle end state,
    wherein the second sub lens group is configured from two lenses including a negative lens and a positive lens disposed in order from the object side to the image side; and
    the variable focal length lens system further satisfies the following expression (2):

$$DsB/fw < 0.15 \qquad (2)$$

where DsB is an air gap between the negative lens and the positive lens of the second sub lens group on the optical axis.

* * * * *